(12) United States Patent
Faybishenko

(10) Patent No.: US 8,432,945 B2
(45) Date of Patent: Apr. 30, 2013

(54) LASER DIODE COMBINER MODULES

(76) Inventor: Victor Faybishenko, San Carlos, CA (US)

( * ) Notice: Subject to any disclaimer, the term of this patent is extended or adjusted under 35 U.S.C. 154(b) by 278 days.

(21) Appl. No.: 12/895,451

(22) Filed: Sep. 30, 2010

(65) Prior Publication Data

US 2012/0081893 A1    Apr. 5, 2012

(51) Int. Cl.
*H01S 3/04* (2006.01)
*G02B 27/20* (2006.01)

(52) U.S. Cl.
USPC .............................. 372/36; 372/34; 362/259

(58) Field of Classification Search .............. 372/34–36; 356/641
See application file for complete search history.

(56) References Cited

U.S. PATENT DOCUMENTS

| | | |
|---|---|---|
| 3,919,663 A | 11/1975 | Caruolo et al. |
| 4,499,582 A | 2/1985 | Karning et al. |
| 4,757,511 A | 7/1988 | Klingel et al. |
| 4,828,357 A | 5/1989 | Arata et al. |
| 5,168,401 A | 12/1992 | Endriz |
| 5,319,528 A | 6/1994 | Raven |
| 5,463,534 A | 10/1995 | Raven |
| 5,579,422 A | 11/1996 | Head et al. |
| 5,877,898 A | 3/1999 | Hollemann et al. |
| 5,987,043 A | 11/1999 | Brown et al. |
| 6,005,717 A | 12/1999 | Neuberger et al. |
| 6,044,096 A | 3/2000 | Wolak et al. |
| 6,229,831 B1 | 5/2001 | Nightingale et al. |
| 6,404,542 B1 | 6/2002 | Ziari et al. |
| 6,462,883 B1 | 10/2002 | Wang et al. |
| 6,556,352 B2 | 4/2003 | Wang et al. |
| 6,665,471 B1 | 12/2003 | Farmer et al. |
| 6,683,727 B1 | 1/2004 | Goring et al. |
| 6,898,222 B2 | 5/2005 | Hennig et al. |
| 7,075,739 B2 | 7/2006 | Mikhailov et al. |
| 7,199,924 B1 | 4/2007 | Brown et al. |
| 7,233,442 B1 | 6/2007 | Brown et al. |
| 7,420,996 B2 | 9/2008 | Schulte et al. |
| 7,436,868 B2 | 10/2008 | Schulte et al. |
| 7,443,895 B2 | 10/2008 | Schulte et al. |
| 7,733,932 B2 | 6/2010 | Faybishenko |
| 2003/0099267 A1 | 5/2003 | Hennig et al. |
| 2004/0012962 A1* | 1/2004 | Wolf .............................. 362/259 |
| 2004/0114648 A1 | 6/2004 | Nagano et al. |

(Continued)

FOREIGN PATENT DOCUMENTS

EP       1 788 678       11/2006

OTHER PUBLICATIONS

Fan, T.Y.; Sanchez, Antonio, "Pump Source Requirements for End-Pumped Lasers," IEEE Journal of Quantum Electronicx, vol. 26, No. 2, Feb. 1990, pp. 311-316.

(Continued)

*Primary Examiner* — Jessica Stultz
*Assistant Examiner* — Phillip Nguyen
(74) *Attorney, Agent, or Firm* — Haynes and Boone, LLP

(57) ABSTRACT

In a laser module (310), single-emitter laser diode chips (110) are positioned at different heights on opposite sides of the module's combined output beam (114). Each laser diode chip (110), and its corresponding fast and slow axis collimators (130, 134), and turning mirror (140) are positioned on a corresponding heat-dissipating surface region (340). High thermal stability and output power are obtained in some embodiments even if the modules are combined to obtain higher-level modules (310-2). Other features and embodiments are also provided.

40 Claims, 15 Drawing Sheets

U.S. PATENT DOCUMENTS

| | | | |
|---|---|---|---|
| 2007/0116070 A1 | 5/2007 | Schulte et al. | |
| 2007/0116077 A1 | 5/2007 | Farmer et al. | |
| 2008/0310027 A1 | 12/2008 | Wilson et al. | |
| 2010/0158060 A1 | 6/2010 | Faybishenko | |
| 2012/0002293 A1* | 1/2012 | Du et al. | 359/629 |

OTHER PUBLICATIONS

Price, K. et al. "KW-Class Industrial Diode Lasers Comprised of Single Emitters" Date: No later than Jan. 2010.

Price, K. et al. "High Brightness Fiber Coupled Pump Laser Development" Date: No later than Jan. 2010.

http://en.wikipedia.org/wiki/Laser_diode Date: No later than Sep. 26, 2010.

http://www.rp-photonics.com/edge_emitting_semiconductor_lasers.html Date: No later than Sep. 26, 2010.

http://www.rp-photonics.com/polarization_of_laser_emission.html Date: No later than Sep. 26, 2010.

http://www.rp-photonics.com/polarization_beam_combining.html Date: No later than Sep. 26, 2010.

Haag, M. et al. "Novel High-Brightness Fiber Coupled Diode Laser Device" Date: Jun. 25, 2010.

"Light Collection and Systems Throughput" Date: Jun. 14, 2010.

Moser, C. "Filters to Bragg About—Volume Holographic Gratings Offer Distinctive Filter Qualities" Reprinted from the Jun. 2005 issue of Photonics Spectra, Laurin Publishing.

"Optics Fundamentals" http://www.newport.com/store/genContent.aspx/Optics-Fundamentals/604533/1033/?&print=1, Date: No later than Sep. 26, 2010.

http://www.rp-photonics.com/gaussian_beams.html, Date: No later than Sep. 26, 2010.

"9W 9xxnm 9μm High Power Single Emitter Laser Diode on Submount" www.oclaro.com; Date: No later than Sep. 26, 2010.

* cited by examiner

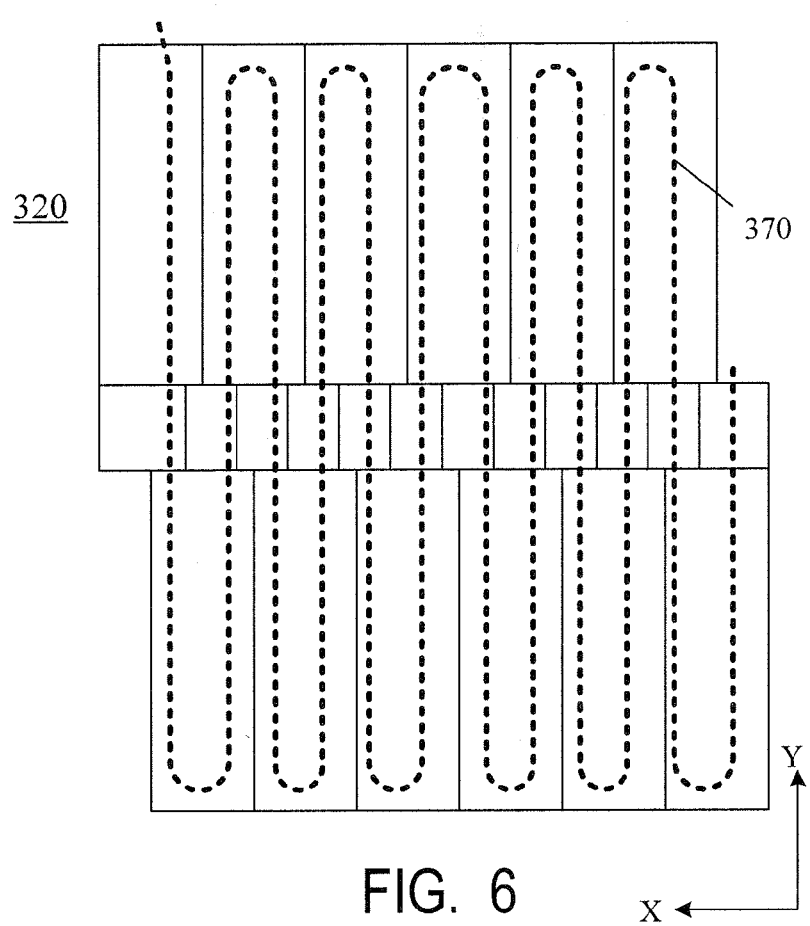
FIG. 6
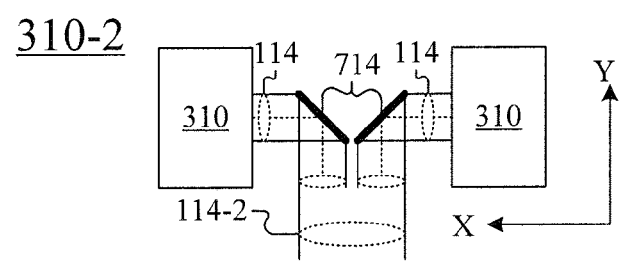
FIG. 7A
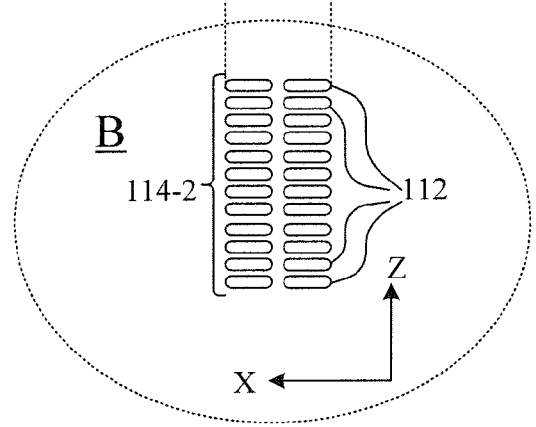

LASER DIODE COMBINER MODULES

BACKGROUND OF THE INVENTION

The present invention relates to laser diode assemblies (laser diode modules) which combine output beams emitted by single-emitter laser diode chips.

Diode lasers are compact, inexpensive to manufacture, and easy to service compared to many other types of lasers. An individual laser diode has a fairly low output power (typically from hundreds of milli-Watt to several Watt), but laser diodes can be combined to obtain a high-power beam, e.g. in kilowatt range. When laser diode beams are combined, the combined beam should preferably be high in brightness and power, and have near diffraction-limited beam quality. However, beam combining for laser diodes is challenging because an individual diode's output beam is asymmetric, being elongated along the diode's pn junction. The beam's divergence is also asymmetric—the divergence is lower along the "slow" axis parallel to the pn junction than along the "fast" axis perpendicular to the pn junction. (The beam divergence along the slow axis can be about 6°-10° measured Full Width at Half Maximum, and along the fast axis about 30°-40°.) This asymmetry complicates beam-combining optics. Complex optics can reduce output brightness and power. In addition, the small size of laser diodes makes cooling more difficult. Uniform cooling is important to reduce mechanical stresses and to maintain alignment between the laser diodes and the optics (misalignment leads to loss of output brightness and power). Cooling is also important for controlling the diodes' output spectrum since the central wavelength and spectral width increase with temperature. Further, heat causes degradation of the diodes' slope efficiency (i.e. the efficiency in converting electrical energy to light).

A multi-diode system can be formed by manufacturing a multiple-emitter chip, e.g. a laser bar or stack, with multiple diodes in a single semiconductor chip. High output power, of tens and even hundreds of watts, can be achieved. However, multiple-emitter diode chips are less reliable than single-emitter diode chips because the multiple-emitter diode chips are harder to cool in uniform manner. Also, a diode's failure in a multiple-emitter chip can affect other diodes in the chip, so the entire chip can become unusable if a single diode fails. Therefore, multi-diode systems of single-emitter chips remain attractive despite their larger size.

FIGS. 1A (top view), 1B (front view), 1C (three-dimensional view) illustrate one such system disclosed in U.S. patent application Ser. No. 12/116,834 filed by Wilson et al., published as US 2008/0310027 A1 on Dec. 18, 2008. The system combines output beams 112 of seven single-emitter laser diode chips 110.1-110.7 to produce a combined beam 114, which is then focused by lens 118 into optical fiber 122. Each diode's output beam 112 is collimated in the fast axis by a respective fast-axis collimator (SAC) 130. The diodes share slow-axis collimator (SAC) 134. The output beam of diode 110.7 is collimated by respective FAC 130 and is then delivered directly to SAC 134. The other six diodes 110.1-110.6 emit beams perpendicular to the output beam of diode 110.7. The output beams of diodes 110.1-110.6 are collimated by the respective FACs 130, and are then reflected (folded) by respective beam-redirecting mirrors 140 towards SAC 134. The seven diodes 110, fast-axis collimators 130, and mirrors 140 are arranged so that their respective beams 112 are stacked one above another (see FIG. 1B) at the input of SAC 134. More particularly, the diodes 110.1-110.7 are arranged at respective different heights, i.e. with a step along the Y direction. Laser diode 110.7 emits the top beam 112. The remaining diodes 110.1-110.6 are arranged in pairs. In each pair, the diodes emit beams in the opposite directions, at different heights. The two mirrors 140 in each pair are located on top of each other. The diodes are located at different distances from the optical axis of the combined beam 114 to equalize the distances between the laser diodes' emitters and the combined beam 114.

As shown in FIG. 1C, the system includes a package 170 which serves as a compound heat sink for the laser diode chips 110. Mirrors 140 are shown as three X-like structures. The mirrors and the chips 110 are disposed with a vertical step (along the Y direction) of 1 mm.

FIGS. 2A-2F show an assembly described in U.S. Pat. No. 7,420,996 B2 issued Sep. 2, 2008 to Schulte et al. This assembly combines multiple single-diode-chip subassemblies 204 one of which is illustrated in FIGS. 2A-2C. Each subassembly 204 includes a single emitter diode laser 110, a mounting block 210, a submount 214, and a FAC lens 130. The subassembly also includes a SAC lens 134, but this lens is used to collimate the output of a laser 110 of the adjacent subassembly 204 as shown in FIG. 2D.

Diode laser 110 is mounted on submount 214 attached to mounting block 210. Submount 214 includes contact pads for contacting the diode laser 110. Submount 214 and mounting block 210 have high thermal conductivity.

Each subassembly 204 is mounted on a respective step 220 (FIG. 2E) of cooling block 224. The subassembly's mounting block 210 provides a thermal path to cooling block 224.

As shown in FIGS. 2D-2F, cooling block 224 holds a row of subassemblies 204 held in place by claims 226. In each subassembly 204, the beam 112 emitted by diode laser 110 is collimated by FAC 130 of the same subassembly, and then by SAC 134 of the next subassembly on the adjacent, lower step 220. For the last, lowest diode 110, the SAC 134 is located on a separate stand 250. The diodes' output beams 112 are stacked one above another in the combined beam, like in the embodiment of FIGS. 1A-1C.

Cooling block 224 can be widened to hold two rows of subassemblies 204, with five diodes in each row. The assembly then produces two combined output beams, which can be combined using known optical techniques.

SUMMARY

This section summarizes some features of the invention. Other features may be described in the subsequent sections. The invention is defined by the appended claims, which are incorporated into this section by reference.

The inventor has observed that in order to provide stable alignment between the laser diodes and the optical components, it is desirable to "thermally isolate" the optical paths of the diodes' output beams 112 in the sense that thermal degradation of the path of any one beam 112 should preferably have a minimal effect on the other beams 112. Thus, for any beam 112, the alignment between the corresponding laser diode and the corresponding optical components (e.g. FAC, SAC, and a beam-redirecting mirror) should remain stable with temperature and should not be affected by the other diodes and optical components.

Some embodiments of the present invention include features like those of FIGS. 1A-1C. In particular, the laser diode chips are positioned at different heights, and their output beams are emitted in the opposite directions. However, a separate SAC is provided for each laser diode. Further, each laser diode, its respective FAC and SAC, and the beam-redirecting mirror are located on a separate continuous, heat-dissipating surface ("heat-dissipating surface region", also called "optical micro-bench" or just "micro-bench" herein). This can be a copper bench for example. The heat-dissipating surface region has a high thermal conductivity, and thus is roughly at a uniform temperature. Heat is absorbed below the heat-dissipating surface regions, so the temperature gradient is directed essentially downward. Consequently, each heat-dissipating surface region remains essentially free of warpage, maintaining the angular orientation and vertical alignment between each laser diode and its respective collimating optics and beam-redirecting mirror. Each subassembly is thus a rigid structure having a high thermal stability. Note the inventor's U.S. Pat. No. 7,733,932 B2, issued Jun. 8, 2010, incorporated herein by reference.

We will use the term "single diode subassembly" to denote a heat-dissipating surface region with its diode chip, FAC, SAC, beam-redirecting mirror, and the respective submounts. In some embodiments, the cooling path from each single-diode subassembly is downward. The single diode subassemblies (and in particular their beam-redirecting mirrors) are laterally offset from each other so as to reduce the thermal impact of one single-diode subassembly on the downward cooling path of any other single-diode subassembly. (Of note, in FIGS. 1A-1C, the beam-redirecting mirrors 140 of one pair of diodes 110 are located one above the other, and SAC 134 is shared by the laser diodes; in FIGS. 2A-2F, SAC 134 for one laser diode 110 is located in subassembly 204 holding another diode 110.) In some embodiments, high thermal stability is provided, with near diffraction-limited beam-quality output.

In some embodiments, even though the mirrors do not overlie each other as in FIGS. 1A-1C, each beam 112 has a small optical path length. The optical path length is affected by the distance (the pitch) between adjacent laser diode chips 110 on each given side of the combined beam. The minimal acceptable pitch may have to be large to ensure adequate heat dissipation (e.g., the size of each submount can be large). However, the pitch between mirrors 140 can be smaller since the mirrors' heat dissipation requirements are lower than for the diodes. In some embodiments, the pitch between the mirrors is about one half of the pitch between the diodes. To avoid brightness and power losses, the length of the slow axis of each beam 112 after collimation is set to be less than one half of the pitch between the diodes. Due to the small pitch between the mirrors, the module's dimension along the combined beam is small, and hence the optical path length of the longest beam 112 is small. Small optical path length is desirable because the beams 112 diverge slightly even after collimation, and the divergence reduces the output brightness.

Some embodiments are compact in size and yet can be effectively and uniformly cooled while providing near diffraction-limited beam quality. Further, some designs according to the present invention are scalable to a large number of diodes ("scalable" in the sense that they retain the properties of small size per diode, effective cooling, and high beam quality). Of note, compact size and effective cooling are mutually conflicting goals, and effective cooling is especially challenging when the number of diodes is large. Therefore, designing a module that is optimized for maximum brightness of the combined beam, maintains near diffraction limited quality output, is compact in size, provides uniform thermal conditions for all laser diodes, and scalable (from a few diodes to maybe thousands of diodes) is generally a difficult challenge. In some embodiments of the present invention, however, in a laser module with single-emitter laser diode chips positioned on different sides of the combined beam on a common carrier, the module size per diode is constant or near constant, i.e. the module size is directly proportional to the number of laser diodes. Further, in some embodiments, the cooling path is essentially downward (towards a heat sink, e.g. a cold plate, positioned below the module), and the laser diodes' thermal impedance remains substantially unchanged when the number of diodes increases. The laser diodes are fairly uniformly distributed over the module area and hence over the heat sink. Of note, the interface between the module and the heat sink can have significant thermal impedance. Therefore, non-uniform distribution of the laser diodes above this interface could lead to non-uniform thermal conditions of different laser diodes and hence to loss of spectral brightness. Further, the maximum thermal impedance per unit area could increase. The uniform distribution of the laser diodes improves scalability because the maximum thermal impedance per unit area remains low and substantially unchanged, and the thermal environment for each diode also remains substantially unchanged, as the number of diodes increases. Some embodiments are believed to be suitable for modules with hundreds or thousands of laser diodes. The invention is not limited however to scalable designs, to a particular position or presence of a heat sink, or other features described above, except as defined by the appended claims.

The invention includes both free-space output, fiber-coupled, and other types of laser modules. In particular, the invention includes both purely spatial beam combining and use of polarization and/or spectral combining techniques which increase the brightness of the output beam. Of note, different optical components can be combined. For example, in each single-diode subassembly, the slow-axis collimation can be performed by the mirror 140 having a positive dioptric power, so a separate SAC can be omitted. Further, other optical components or functions can be present. Such optical components for each single-diode subassembly can be rigidly attached to the respective heat-dissipating surface region. For example, wave locking filters (e.g. Bragg filters) may be used to reduce the combined beam's spectral width. In some embodiments, in each single-diode subassembly, the Bragg filter is rigidly attached to the same heat-dissipating surface region as the rest of the subassembly. The Bragg filter can be combined with other optical components, e.g. the Bragg filtering can be performed by the mirror 140.

The invention is applicable to many types of diode lasers, and in particular to many types to edge emitting diode lasers including broad-area laser diodes, quantum well laser diodes, and possibly other types. The invention is applicable to external cavity diode lasers. In some embodiments using external cavity lasers, the optical components defining the external cavity in each single-diode subassembly are rigidly attached to the subassembly's heat-dissipating surface region. The optical components of each subassembly are formed as structurally separate (i.e. as a separate structure or structures) from the optical components of any other subassembly. For each subassembly, the corresponding optics can be spaced from the optics of any other subassembly. In other embodiments, however, a single optical component may be shared by a number of laser diodes. For example, the external cavity may be terminated by a Bragg filter reflecting a percentage (e.g. 10%) of light energy at in a selected narrow bandwidth of wavelengths or frequencies, to stimulate more emission in this bandwidth and thus to increase the spectral brightness within that bandwidth. A separate Bragg filter may be provided for each laser diode, or a single Bragg filter may used in front of multiple diodes.

In some embodiments, the combined beams emitted by different modules are combined with each other to obtain even higher power. Due to thermal stability and low thermal resistance of the individual modules, the thermally induced spectral shift is small, and the beam formed of the combined output beams of the individual modules has near diffraction-limited beam quality. Some embodiments provide kilo-watt output power and may be suitable for use in material processing; as optical pumps for Diode Pumped Alkali Laser (DPAL); as optical pumps for chemical oxygen iodine laser (COIL) and all-gas-phase-iodine-laser (AGIL). Other possible applications include National Ignition Project (NIF) laser fusion engine; laser power beaming; and pumping of more conventional lasers such as fiber laser, slab laser, and other solid state lasers. High power lasers also have military applications. Still other applications may be possible. The invention is not limited to any particular uses or to a specific range of output power, or to other features and advantages described above, except as defined by the appended claims.

BRIEF DESCRIPTION OF THE DRAWINGS

FIG. 6 is a top view of a carrier used in the laser diode module of FIG. 3A.

FIGS. 7A, 7B, 8A, 8B are top views of laser diode modules according to some embodiments of the present invention.

DESCRIPTION OF SOME EMBODIMENTS

The embodiments described in this section illustrate but do not limit the invention. For example, the inventions is not limited to particular dimensions and spatial arrangements except as defined by the appended claims. The features described as "horizontal" or "vertical" refer to a particular spatial orientation. However, neither the invention nor its embodiments are limited to any particular spatial orientation in manufacture, use or operation unless noted otherwise.

Figure 3A:
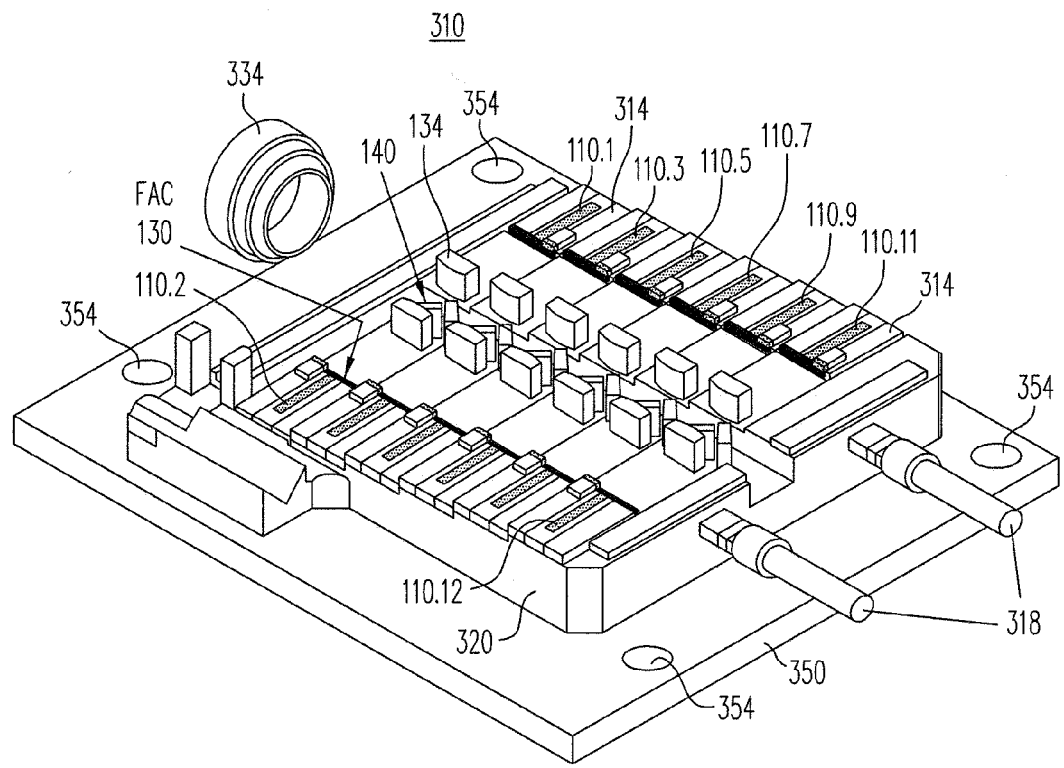
FIG. 3A is a three-dimensional view of a laser diode module according to some embodiments of the present invention.
Figure 3A:
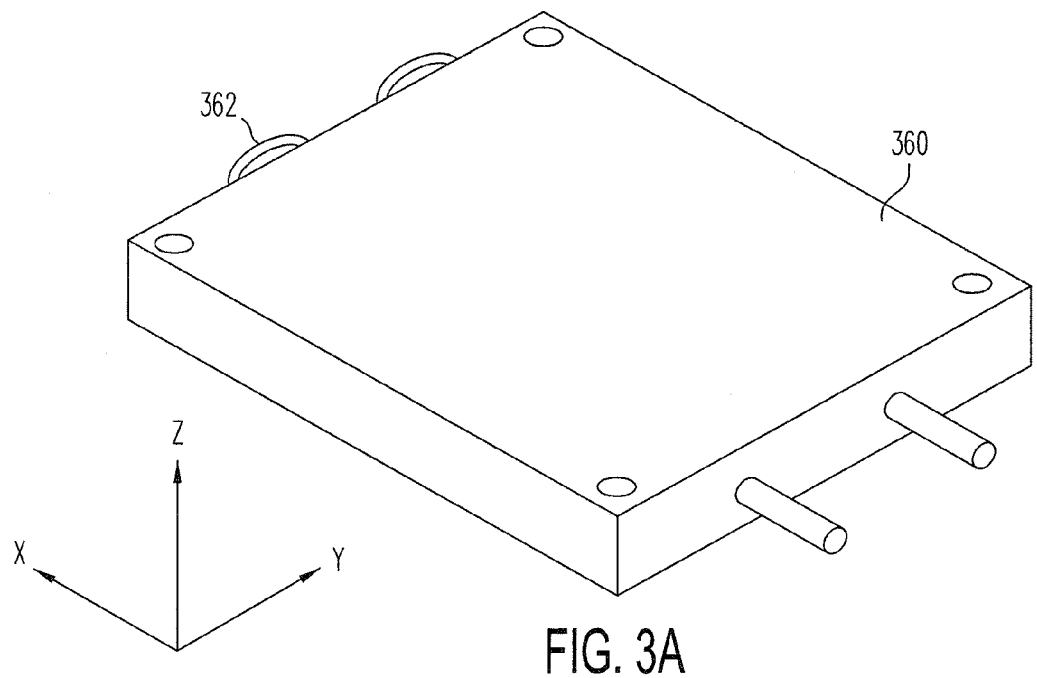
Figure 3B:
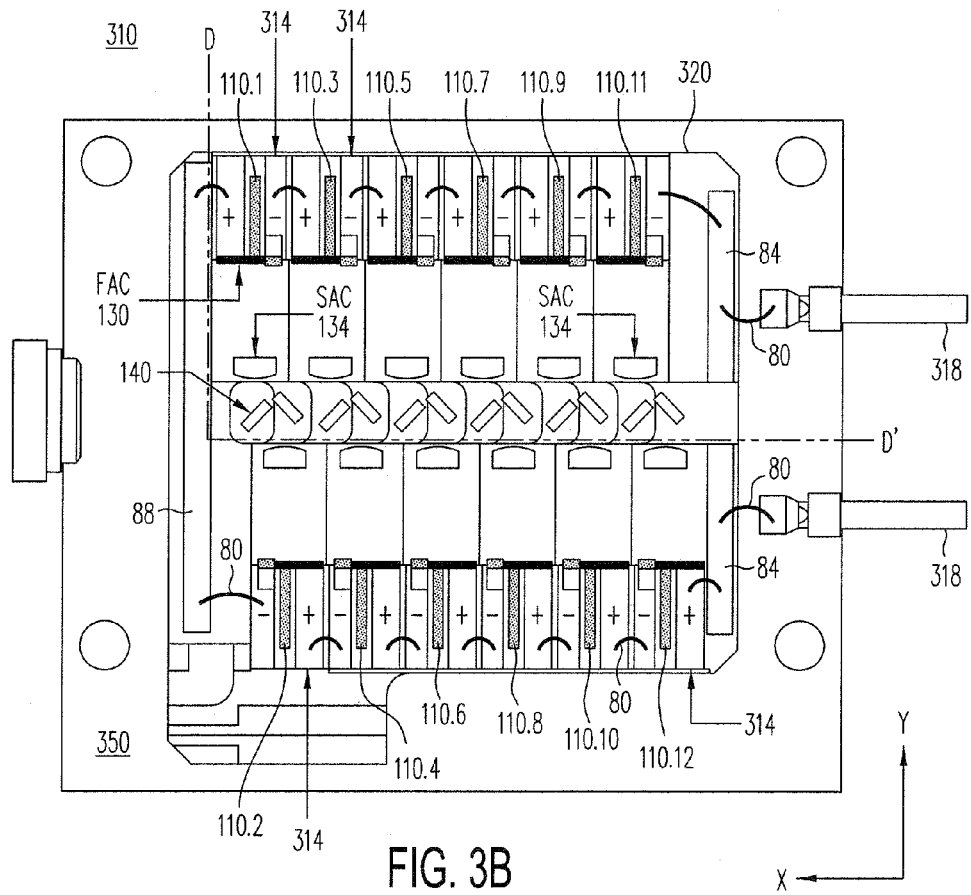
FIG. 3B is a top view of the laser diode module of FIG. 3A.
Figure 3C:
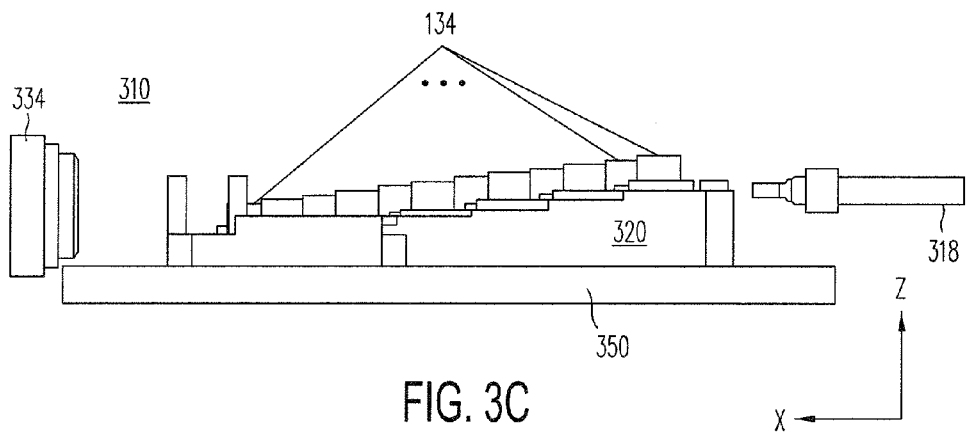
FIG. 3C is a side view of the laser diode module of FIG. 3A.
Figure 3D:
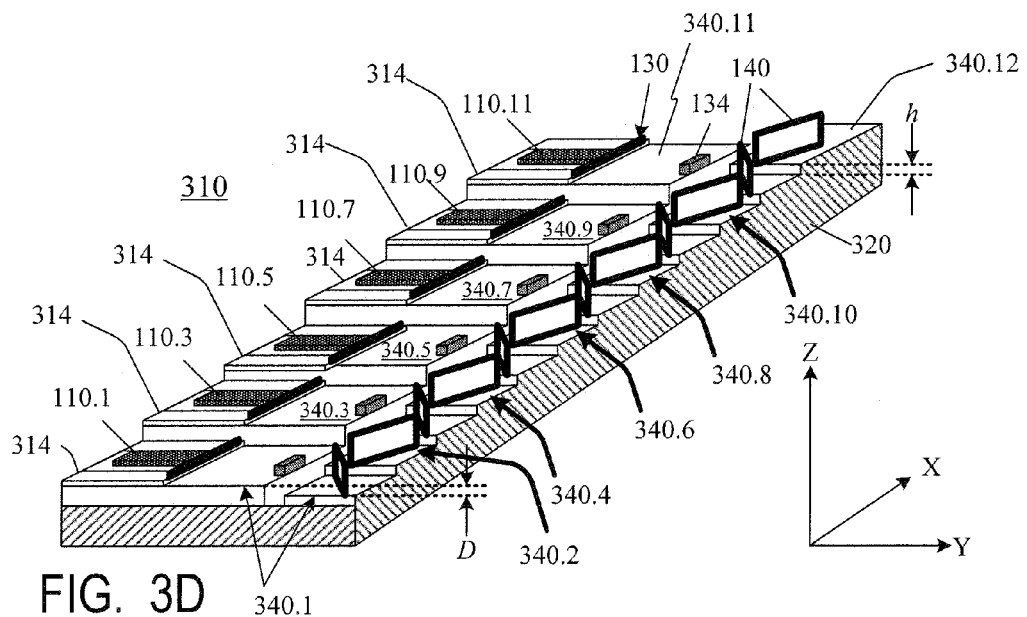
FIG. 3D is a perspective view of the laser diode module of FIG. 3A.

FIGS. 3A-3D, 4A-4B, and 5A-5B illustrate a laser assembly (laser module) 310 according to some embodiments of the present invention. FIG. 3A is a three-dimensional view; FIG. 3B is a top view; FIG. 3C is a side view; FIG. 3D is a three-dimensional, cross-sectional view showing a vertical cross section along the line D-D' shown in FIG. 3B; FIGS. 4A, 4B, and 5A-5B are top views like FIG. 3B but showing some additional features.

Module 310 includes 12 single-emitter laser diode chips 110.1-110.12. Each diode chip 110 (i.e. 110.1-110.12) is mounted on a respective submount 314 in chip-on-submount (CoS) configuration. Each submount 314 has high thermal conductivity, and can be dielectric (e.g. ceramic) or it can be conductive but arranged to provide electrical insulation of the electrical path driving the diodes 110 from carrier 320. Each submount 314 includes electrical contacts (shown as "+" and "−" in some of the figures) that are connected to the p and n type regions of the respective diode 110. The diodes 110 are connected in series or in parallel to input terminals 318 through which the driving current is supplied to the diodes.

The invention is not limited to any particular number of diodes or to use of submounts 314.

In the embodiment being illustrated, the diodes are connected in series. As seen in FIG. 3B, each submount 314 has a positive terminal ("+") on one side of the respective diode 110, and a negative terminal ("−") on the other side of diode 110. The positive terminal is connected to the diode's anode, and the negative terminal to the diode's cathode. The input terminals 318 are connected, by wires schematically shown at 80, to respective conductive strips 84. One wire 80 connects one of strips 84 (the strip on the right bottom in FIG. 3B) to the positive terminal of submount 314 of diode 110.12; another wire 80 connects the negative terminal of submount 314 of diode 110.12 to the positive terminal of submount 314 of diode 110.10; and so on. The submount of diode 110.2 has its negative terminal connected to a conductive strip 88. Strip 88 is also connected, by another wire 80, to the positive terminal of submount 314 of diode 110.1. Respective wires 80 connect the negative terminal of submount 314 of diode 110.1 to the positive terminal of submount 314 of diode 110.3, and so on. The negative terminal of submount 314 of diode 110.11 is connected to the top strip 84. The wires are not shown in the remaining figures. No aspect of the invention is limited to a particular electrical connection unless specifically stated otherwise.

Submounts 314 are rigidly attached to the top surface of carrier 320 which can be made, for example, of copper or some other metal or non-metal material having high thermal conductivity. The submounts 314 are attached to carrier 320 in a thermally conductive manner, e.g. soldered, or by thermally conductive adhesive such as a suitable epoxy, or by fasteners, and/or other means, to make the carrier effective in dissipating heat generated by the diodes.

Figure 4A:
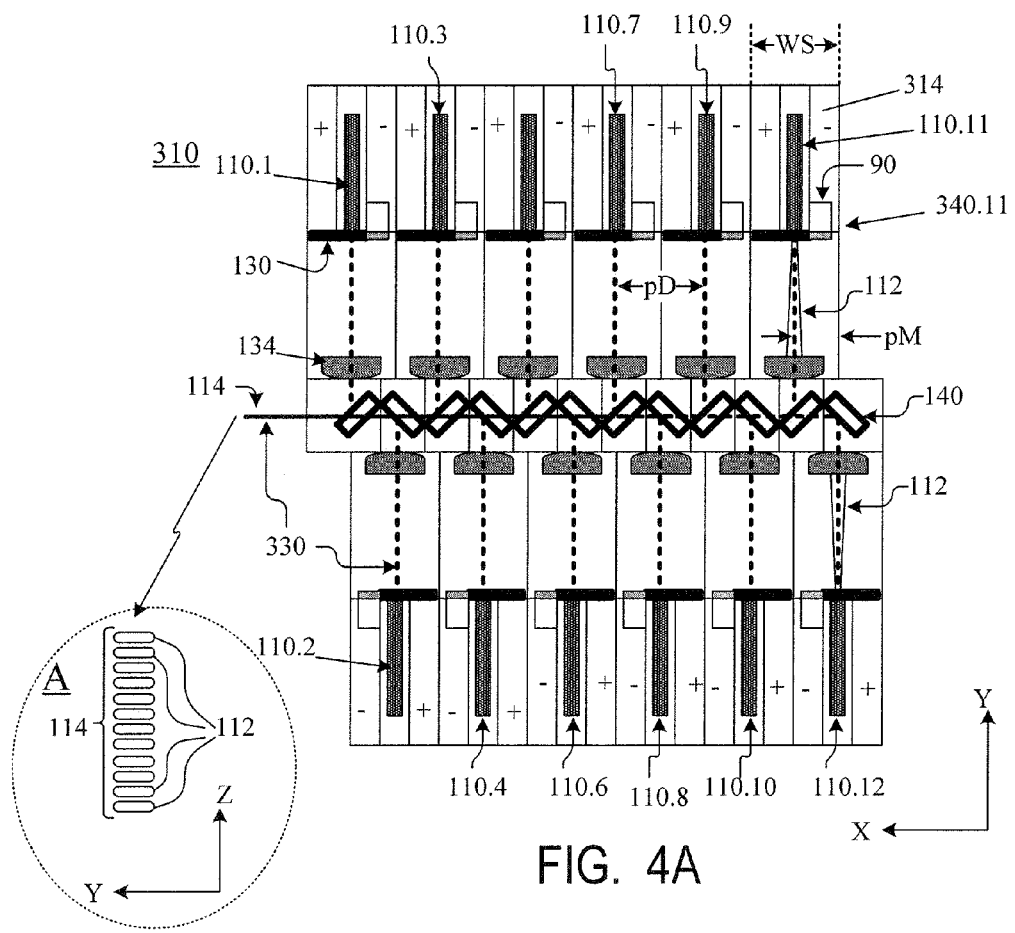
FIGS. 4A, 4B, 5A are top views of the laser diode module of FIG. 3A.
Figure 5A:
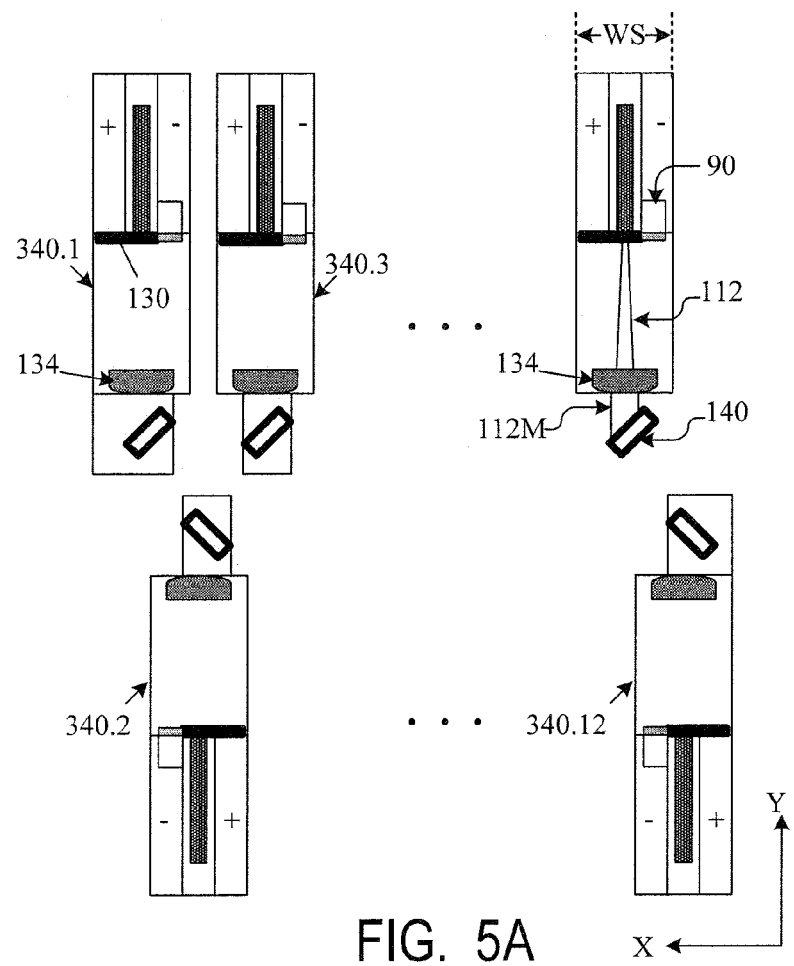

As seen in FIG. 4A, each diode 110 emits a respective beam 112 in the positive or negative Y direction in an XYZ Cartesian coordinate system. The beam's slow axis is horizontal, parallel to the X axis. The beam's fast axis is vertical, i.e. parallel to the Z axis. Beam 112 is collimated in the fast axis by respective fast axis collimator (FAC) 130 rigidly attached to the top surface of the respective carrier 320 or to respective submount 314 immediately in front of the diode's emitter. In the embodiment shown, each FAC 130 is rigidly attached to the respective submount 314 using a small member 90 (FIGS. 4A, 5A). No aspect of the invention is limited to any particular attachment unless stated otherwise.

The output beam of FAC 130 is collimated in the slow axis by respective slow axis collimator (SAC) 134. The beam's optical axis 330 (FIGS. 4A, 4B) is a straight or nearly straight line parallel to the Y axis and passing through the respective collimators 130, 134 to the respective turning mirror (beam-redirecting mirror) 140. Mirror 140 is flat, and it turns the beam by 90°. The beam reflected by mirror 140 propagates in the positive X direction to an output window 334. The beams 112 exit through output window 134 as a combined free-space output beam 114.

Six of the diodes (110.2, 110.4, 110.6, 110.8, 110.10, 110.12) emit their beams 112 in the positive Y direction, and the remaining diodes emit their beams 112 in the negative Y direction. Mirrors 140 are located in an area between the diodes 110. Mirrors 140 turn all the beams 112 to the positive X direction. The beams 112 are vertically offset relative to each other, so the combined beam 114 is a stack of beams 112 as shown in insert A in FIG. 4A.

As shown in FIG. 3D and emphasized in FIG. 5A, the top surface of carrier 320 has stages ("heat dissipating surface regions") 340.1 to 340.12. Each heat dissipating surface region 340.$i$ (where i varies from 1 to 12 inclusive) is a continuous region which supports the respective CoS structure 110.$i$/314 with the corresponding FAC 130, SAC 134 and mirror 140. In FIG. 5A, different regions 340 are shown as if pulled apart. Each region 340 can be flat, but in the embodiment of FIGS. 3A-3D and FIGS. 4A-4B and 5A-5B the region 340 portion underlying the mirror 140 is lowered to help align the mirror with the respective diode 110, FAC 130, and SAC 134. Other portions of region 340 can also be lowered, e.g. the regions underlying FAC 130 and SAC 134. FIG. 3D does not show entire regions 340.2, 340.4, 340.6, 340.8, 340.10, 340.12, but shows only the portions underlying the mirrors 140.

Each diode 110 and the corresponding FAC 130, SAC 134 and mirror 140 are rigidly attached to the corresponding heat-dissipating surface region (micro-bench) 340. The attachment of diode 110 may include submount 314, but other types of attachments are also possible. The attachments of FAC 130, SAC 134 and mirror 140 may also include submounts. All the attachments are thermally conductive. The attachments may also include soldering, or thermally conductive adhesive such as a suitable epoxy, or fasteners, and/or other means, to provide effective heat dissipation.

As shown in FIG. 3D, regions 340 are located at respective different heights to create the stacked beam 114 in which the individual beams 112 are adjacent to each other but do not merge or merge only at the top and bottom edges. The vertical step h between the adjacent regions 340 is 0.25 mm in some embodiments. The topmost regions 340.11, 340.12, separated by the step h in the Z direction, are the regions immediately adjacent to contacts 318. Regions 340 are indexed in the order of increasing height, i.e. region 340.1 is the lowest, then, in the order of increasing heights, are regions 340.2, 340.3, 340.4, and so on.

Figure 4B:
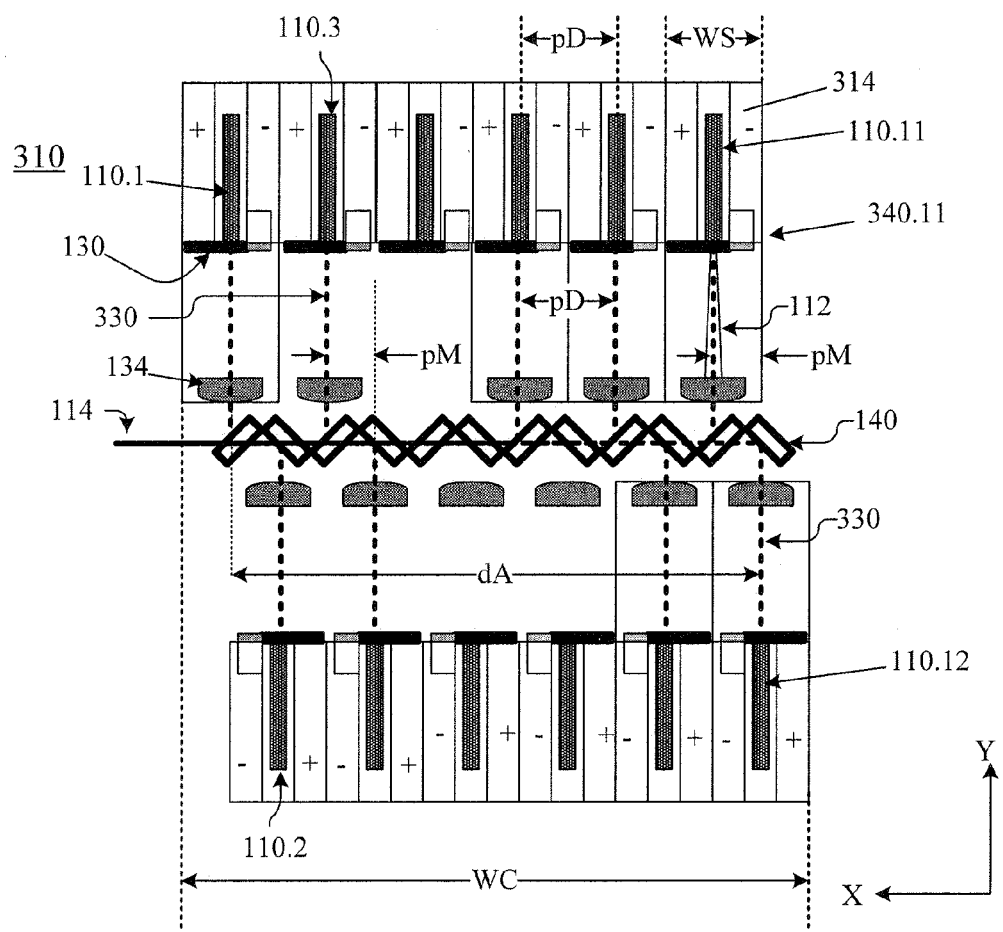

The size of submount 314, and in particular the submount width WS (FIGS. 4A, 4B) along the X axis, is sufficiently large to provide desired heat dissipation. As seen in FIGS. 4A and 4B, the submount width WS is equal (or about equal) to the pitch pD between the adjacent diodes 110 located on the same side of combined beam 114. (The pitches can be measured in top view, i.e. in the orthogonal projection on the XY plane; the pitches can also be measured along the X axis, i.e. in the orthogonal projection on the X axis; in this discussion, the top view pitches will be assumed unless stated to the contrary.) The diode pitch pD can be measured as the distance (along the X axis in top view) between the diodes' optical axes. WS is equal to or slightly smaller than pD. The diode pitch pD can be chosen based on heat dissipation requirements as explained above.

The amount of heat generated by diodes 110 depends on the desired output power and on the diodes' efficiency in converting electric energy to light. Therefore, in some embodiments, the width WS and the pitch pD cannot be reduced below some minimal value. The sum of the pD pitches is thus pD*N where N is the number of diodes 110 (N=12 in the embodiment being discussed). However, the total width WC (FIG. 4B) of carrier 320 is only pD*(N/2+1/2), i.e. about twice smaller. The small length of carrier 320, and hence the small path length of beams 112, is achieved by an appropriate selection of diodes 110, FACs 130, SACs 134, and mirrors 140 as follows.

The heat dissipation requirements for mirrors 140 are defined by mirror light absorption and are low compared to the diodes. Therefore, the pitch pM (FIG. 4B) between adjacent mirrors 140 is only half of the diode pitch pD. The mirror pitch pM can be measured as the distance between the points of intersection of the mirrors with the optical axes 330 of the respective diodes 110; the mirror pitches are assumed to be in top view along the X axis in this discussion. Of note, adjacent mirrors 140 correspond to diodes 110 located on the opposite sides of combined beam 114. Therefore, in top view, the total X-dimension WC (FIG. 4B) of carrier 320 is only pD*(N+1)/2, i.e. equal or slightly larger than WS*(N+1)12, as indicated above. Further, the maximum X-dimension dA between the optical axes 330 of beams 112 (the distance between the optical axes of diodes 110.1, 110.12 in FIG. 4B) is only pD*(N−1)/2. The small distance dA is beneficial for two reasons. One reason is the resulting low divergence of beams 112. The other reason is the resulting low difference between the divergences of different beams 112, and hence a more uniform brightness and more rectangular-like shape of the combined beam 114.

The small value of mirror pitch pM places a limit on the aperture of each mirror 140. In some embodiments, the X-axis clear aperture of mirror 140, i.e. the projection parallel to the Y axis of the clear aperture of each mirror 140 on the X axis, does not exceed the mirror pitch pM. In some embodiments, in order to ensure that the small mirror aperture does not lead to losses of power and brightness, the slow axis of each collimated beam 112 (at the output of SAC 134) is limited to the X-axis clear aperture of mirror 140. In FIG. 5A, reference designation 112M marks the section of beam 112 between the corresponding SAC 134 and mirror 140. Obviously, if the X-axis clear aperture of each mirror 140 is at most half of the diode pitch pD or of the submount width WS, then the slow axis SA of beam 112 (FIG. 5B) at section 112M should also be at most half of pD or WS respectively.

Figure 5B:
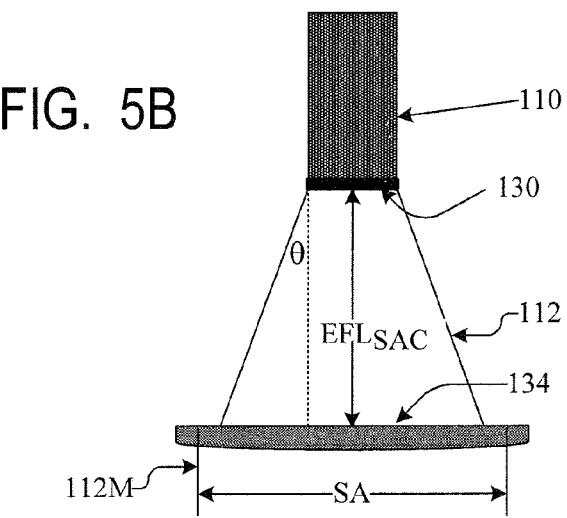
FIG. 5B is a top view of some features of the laser diode module of FIG. 3A.

FIG. 5B is an enlarged top view of a beam 112 of one diode 110. The length of the slow axis at section 112M is shown as SA. The slow-axis angle of the marginal ray coming from diode 110 is shown as θ. The effective focal length of SAC 134 is shown as $EFL_{SAC}$. Clearly, $$EFL_{SAC} \leq SA/2/\tan\theta \quad (1)$$

If SA≤pD/2 as noted above, then $$EFL_{SAC} \leq pD/(4*\tan\theta) \quad (2)$$

In some embodiments, the angle θ is sufficiently small for the value tan θ to be approximated by the slow-axis numerical aperture $NA_{SA}$ of diode 110. ($NA_{SA}=n*\sin\theta$ where n is the refractive index of the media (e.g. air) in which the diodes are located; for air, n is close to 1.) In such embodiments, $EFL_{SAC}$ can be chosen to satisfy the equation:

$$EFL_{SAC} \leq pD/(4*NA_{SA}) \quad (3)$$

Thus, in some embodiments, the diode pitch pD is selected based on thermal dissipation considerations and the size of submount 314. Then SACs 134 are designed to satisfy formula (2) or (3).

Then the number N of diodes is selected based on other requirements. For example, in some embodiments, it is desired to provide a more square shape of the combined beam 114, and/or to improve uniformity of the optical invariant along the slow and fast axes, e.g. for coupling the beam 114 into an optical fiber. In those embodiments in which it is desirable to provide a more uniform optical invariant, the number N of diodes is selected to equal a value N' where N' is chosen to satisfy:

$$N' \leq (NA_{SA} * EMITTER\_SIZE_{SA}) / (NA_{FA} * EMITTER\_SIZE_{FA}) \quad (4)$$

where $EMITTER\_SIZE_{SA}$ is the size of the emitter of diode 110 in the slow axis; $EMITTER\_SIZE_{FA}$ is the size of the emitter of diode 110 in the fast axis; $NA_{SA}$ is the diode's numerical aperture in the slow axis; and $NA_{FA}$ is the diode's numerical aperture in the fast axis.

If N is larger than the value on the right-hand side of inequality (4), then the beam will not be uniform in the optical invariant in the fast and slow axes.

The vertical step h between the adjacent regions 340 can be selected to keep the beams 112 separate in the combined beam 114. More particularly, in some embodiments:

$$h \geq 2 * EFL_{FAC} * NA_{FA}$$

wherein $EFL_{FAC}$ is the effective focal length of the fast axis collimator 130.

For example, in some embodiments, WS=4 mm, and pD is slightly larger, e.g. 4.2 mm. The slow axis of each beam 112 is about 90 μm at the emitter of diode 110. The beam's divergence (i.e. angular divergence) in the slow axis is about 9° (about 150 milliradians), so the numerical aperture NA=Sin 9/2° is about 0.08 in the slow axis. SAC 134 increases the beam's slow axes to about 1~2 mm, and reduces the slow-axis divergence to about 17 mrad (milliradians). The X-axis clear aperture of each mirror 140 is 1.2 mm. The clear aperture of SAC 134 in the slow axis is 1.3 mm, and is about 80% of the SAC's X-dimension.

Other parameters are selected to provide a more square shape of the combined beam 114, and/or to improve uniformity of the optical invariant along the slow and fast axes. For example, in some embodiments in which it is desirable to provide a more uniform optical invariant, each beam 112 is about 200 μm along the fast (vertical) axis and 1.2 mm along the slow axis at the output window 334. The distance between the adjacent beams 112 is 250 μm in top view. Each beam 112 at the output of diode 110 is 1.2 μm long in the fast axis and about 90 μm long in the slow axis. The beam's numerical aperture (NA) is about 0.5 (30° divergence) along the fast axis and about 0.08 (9° divergence) along the slow axis. FAC 130 increases the beam size to about 200 μm along the fast axis. SAC 134 increases the beam size to about 1.2 mm along the slow axis. The beam divergence becomes about 7.6 mrad along the fast axis and about 15 mrad along the slow axis. The width of combined beam 114 becomes about half of the beam's height. The optical invariant of the combined beam is about 5.2 μm along the fast axis and about 4.7 μm along the slow axis. These parameters are exemplary and not limiting.

As shown in FIG. 3A, carrier 320 can be placed on the flat, middle portion of a base plate 350 made of a material having high thermal conductivity and a low coefficient of thermal expansion, e.g. a suitable copper alloy. Carrier 320 can be attached to base plate 350 in a thermally conductive manner, e.g. by thermal grease, compressible thermal interface, by epoxy, or possibly other means. Base plate 350 has threaded holes 354 at its corners (or at other locations in some embodiments). Screws (not shown) are threaded through holes 354 to attach the base plate to a cold plate 360. Cold plate 360 can be actively cooled, for example, by liquid flowing through tubing 362, or by air, a thermo-electric cooler, or other means. Suitable cold plates are available, for example, from TE Technology, Inc. of Traverse City, Mich., or from Wakefield Solutions, Inc. of Pelham, N.H.

In another embodiment, carrier 320 is cooled by a fluid (e.g. deionized water) flowing through a passage through the carrier. Cold plate 360 may or may not be present. FIG. 6 is the top view of carrier 320, with an exemplary passage 370 shown by a dotted line. In this embodiment, the passage 370 is a zigzag passage making a pass underneath each region 340. In some embodiments, all of passage 370 is located at about a constant distance from the overlying regions 340 (and therefore the passage's Z coordinate is smaller under lower regions 340 than under higher regions 340) for uniform cooling of regions 340. In other embodiments, all of passage 370 is at a constant depth (constant Z coordinate), and is thus farther from higher regions 340 than from lower regions 340. However, the coolant flow is from the higher regions 340, so the coolant is the coldest adjacent the higher regions 340 to provide more uniform cooling across the different regions 340. Other cooling structures and methods are also possible.

As indicated above, in some embodiments SACs 130 and FACs 134 do not provide divergence-free collimation, so the beams 112 slightly diverge in the combined beam 114. The divergence is higher for beams 112 produced by higher diodes 110 (farther from output window 334) because these beams 112 have longer paths at any point along combined beam 114. If desired, the paths of beams 112 can be equalized by increasing the distance between different CoS structures 110/314 and any point along combined beam 114 as in FIGS. 1A-1C. The module 310 will become less compact however.

Figure 1A:
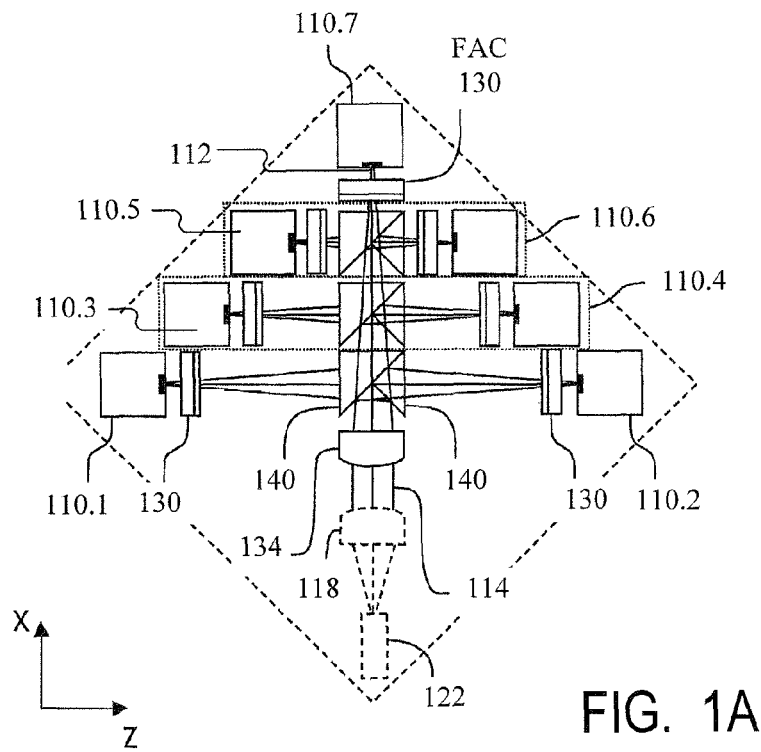
FIG. 1A is a top view of a laser diode assembly according to prior art.
Figure 1B:
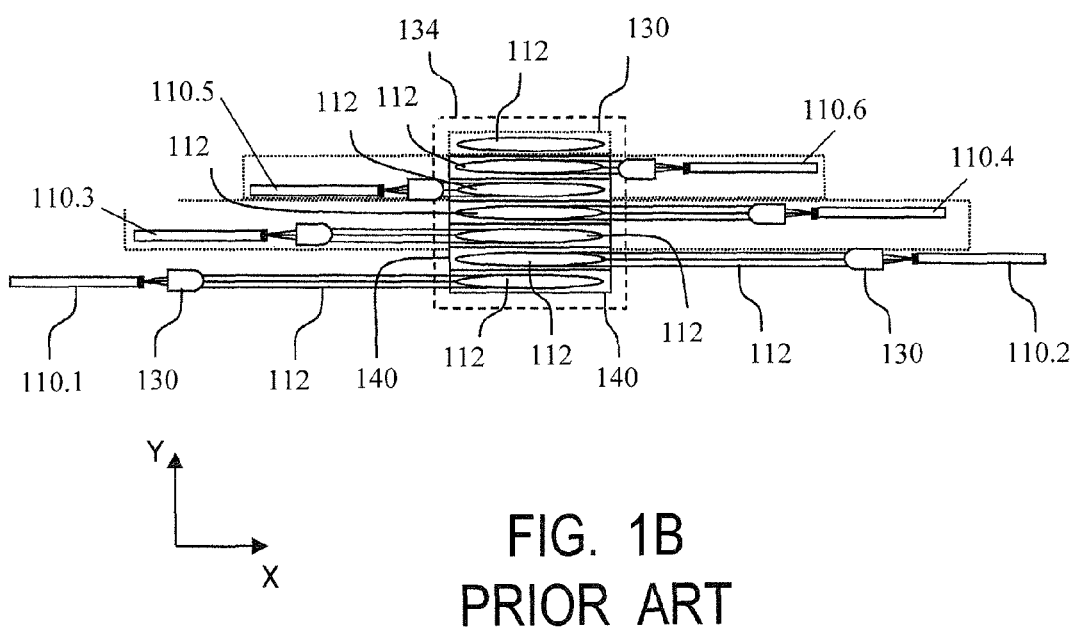
FIG. 1B is a front view of the laser diode assembly of FIG. 1A.
Figure 1C:
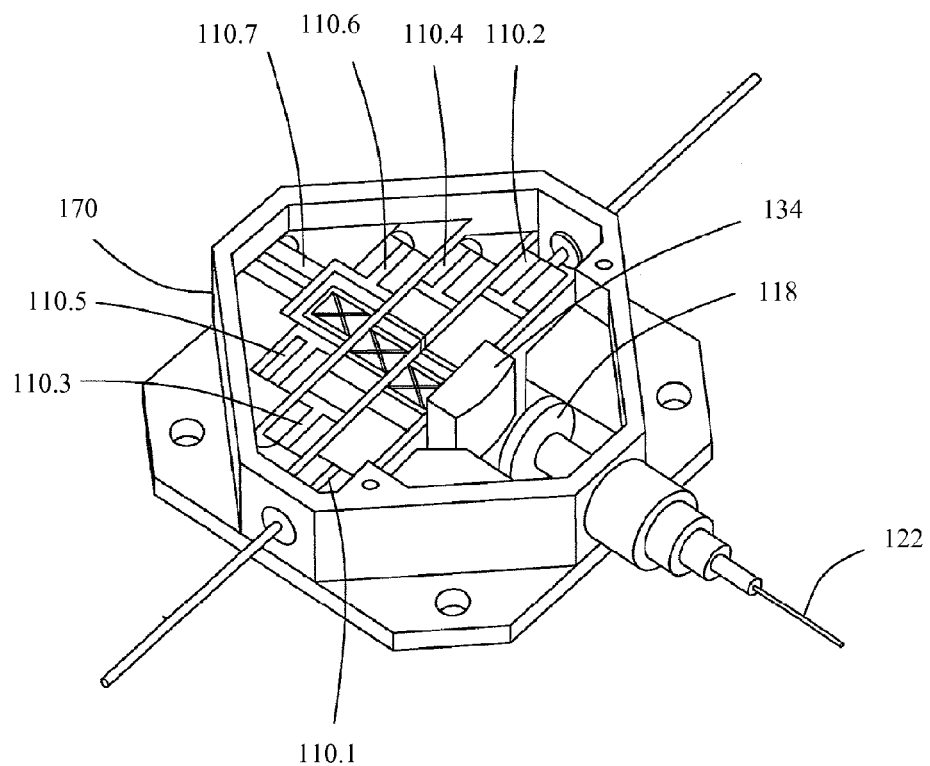
FIG. 1C is a three-dimensional view of the laser diode assembly of FIG. 1A.
Figure 2A:
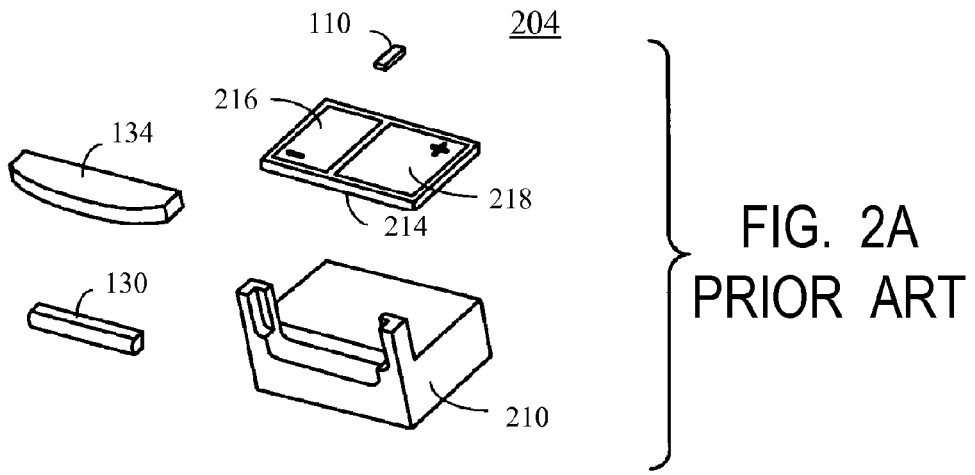
FIGS. 2A, 2B, 2C are perspective views of components of a laser diode assembly according to prior art.
Figure 2B:
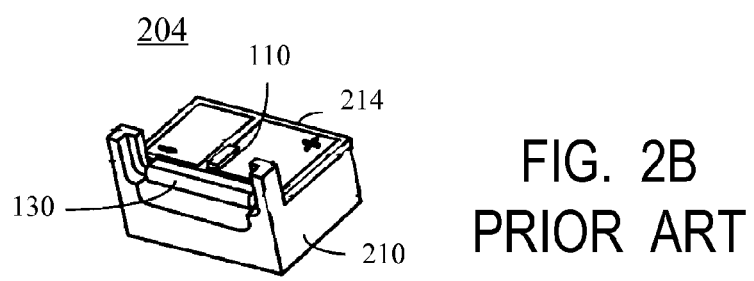
Figure 2C:
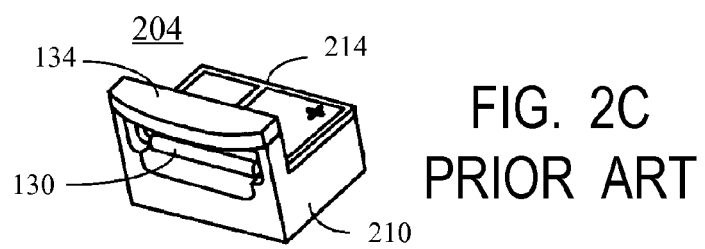
Figure 2D:
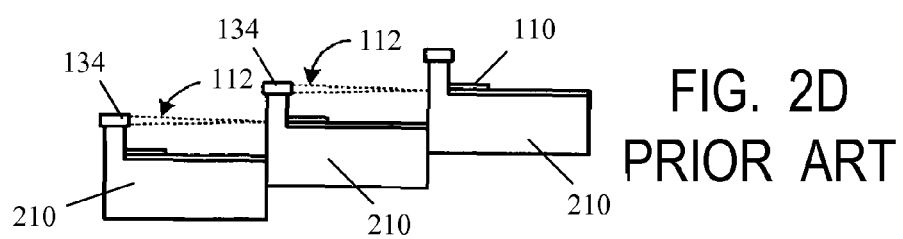
FIG. 2D illustrates the relationship between some of the components of the laser diode assembly of FIGS. 2A-2C.
Figure 2E:
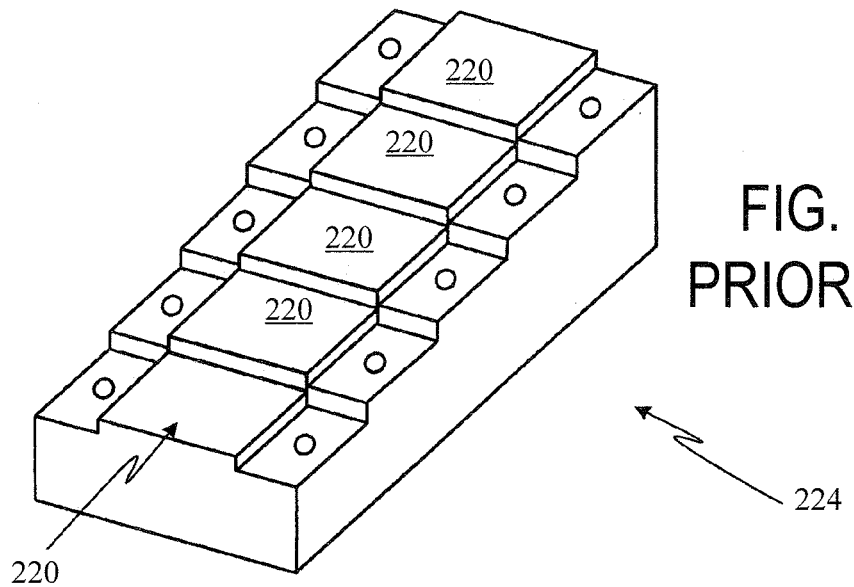
FIG. 2E is a three-dimensional view of a cooling block used in the laser diode assembly of FIGS. 2A-2C.
Figure 2F:
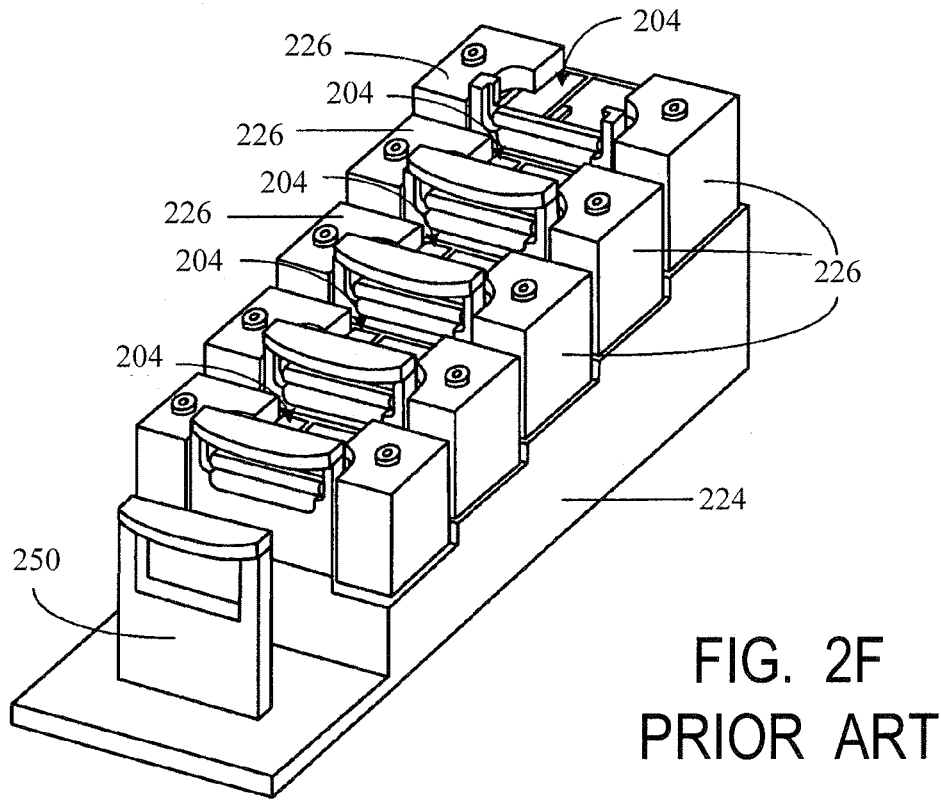
FIG. 2F is a three-dimensional view of the cooling block with diode laser subassemblies for the assembly of FIGS. 2A-2E.

In some embodiments (not shown), an additional CoS structure 110/314 (not shown) is provided to emit a beam 112 along the axis of combined beam 114, without a mirror 140, as in FIGS. 1A-1C. The additional CoS structure is provided with its own FAC and SAC (not shown). The additional CoS structure and its FAC and SAC are located on a separate heat-dissipating surface region 340 (not shown) of carrier 320, and this region 340 is positioned higher than any other region 340.

High thermal stability is achieved in some embodiments due, at least in part, to having a separate heat-dissipating surface region 340 for each combination of a CoS structure 110/314 and the respective FAC 130, SAC 134 and mirror 140. In particular, the alignment between each diode 110 and its FAC 130, SAC 134, and mirror 140 remains stable in thermal cycling because the corresponding region 340 remains substantially flat and free of warpage. The region 340 portion underlying the mirror 140 is lower, by some step D (FIG. 3D), than the portion underlying the corresponding CoS structure 110/314, FAC 130 and SAC 134. The step D may increase in thermal expansion, and in some embodiments the size of mirror 140 is chosen sufficiently large to avoid or minimize energy losses when D increases. In some embodiments, at room temperature, D=1.8 mm, h=0.25 mm, and the height/width of each mirror 140 is 2 mm×2.1 mm.

Due to high thermal stability, both brightness and power losses are small in thermal cycling, and the combined beam 114 maintains near diffraction-limited beam quality. As a result, multiple modules 310 can be combined to obtain a beam of still higher power while maintaining high brightness and near diffraction-limited high quality in a side-by-side beam combiner.

Further, if the constituent beams 112 have linear polarization with parallel electric fields (for example, if diodes 110 are identical and emit linearly polarized light), then the linear polarization is preserved in beam 114. This is advantageous because some laser pumping techniques require a polarized laser beam for pumping a laser. Further, polarized beams can be merged into a single beam using polarization beam combining to obtain a beam of higher brightness.

FIG. 7A is a schematic top view of one such combiner module 310-2. For ease of reference, modules 310 of the type of FIGS. 3A-3D will be called herein "first level modules" or "L1 modules" or "level one modules", and the module 310-2 of FIG. 7A will be called a "second level module" or "L2 module" or "level 2 module". Module 310-2 includes two L1 modules 310. One of these modules 310 emits its output beam 114 in the positive X direction, and the other one of L1 modules 310 emits its output beam 114 in the negative X direction. The optical axes of the two beams 114 are positioned on a common straight line. The slow axes of the constituent beams 112 are parallel to the Y axis. Each output beam 114 is turned by respective flat mirror 714 by 90° so that the optical axes of the two beams become parallel to the Y axis. The beams 114 reflected by mirrors 714 propagate in the negative Y direction to form a "level-two" combined beam 114-2. A vertical cross section of beam 114-2 by a plane parallel to the XZ plane is shown in insert B. In this cross section, beam 114-2 consists of a two-column array of beams 112. The slow axes of beams 112 are parallel to the X axis, and the fast axes are parallel to the Z axis. In some embodiments, the pitch between the adjacent columns of beams 112 (i.e. the distance between the optical axes of the adjacent beams 112 in the same row) is 1.5 mm. The separation between the beams 112 decreases along the beams' optical axes due to slight divergence of beams 112. In some embodiments, the maximum separation (at the beginning of beam 114-2) is no more than about 10 µm to 30 µm due to the large clear aperture of flat mirrors 714. (Of note, mirrors have been used to combine non-diode laser beams as described in U.S. Pat. No. 4,828,357 issued May 9, 1989 to Arata et al., incorporated herein by reference.)

If the constituent beams 112 have linear polarization with parallel electric fields, then the linear polarization is preserved in the L1 beam 114 and the L2 beam 114-2.

Figure 7B:
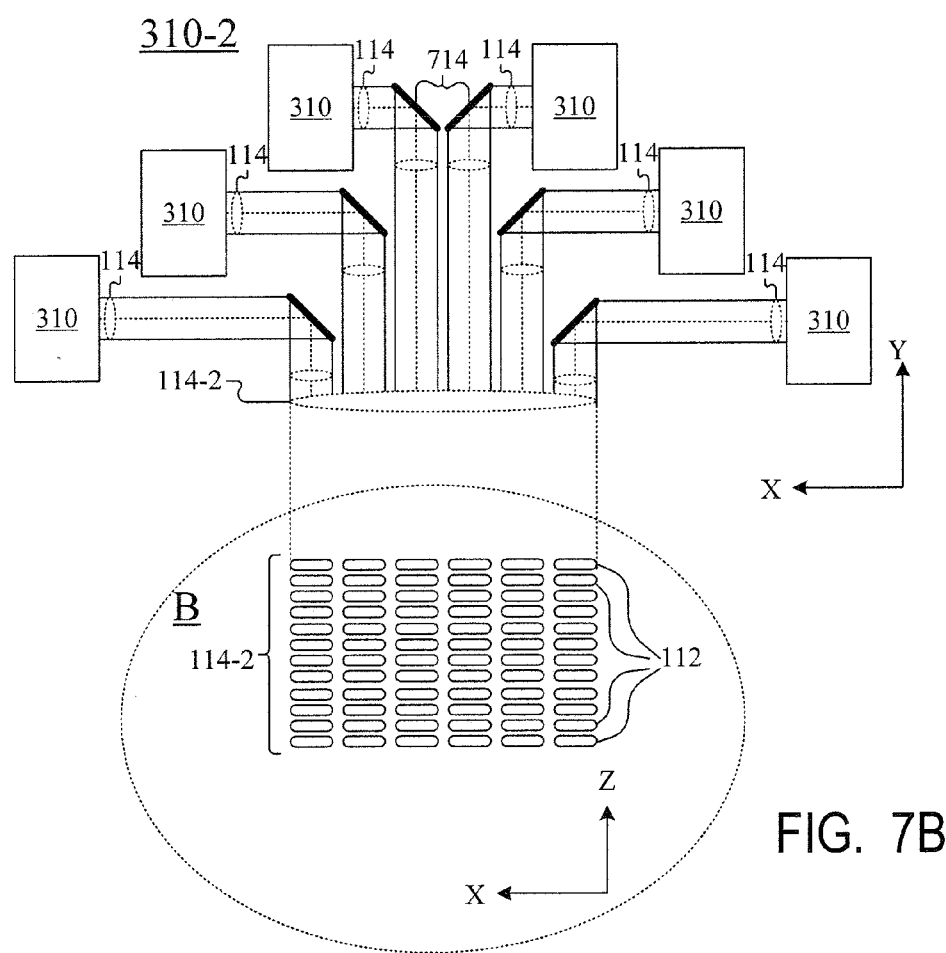

FIG. 7B is similar to FIG. 7A but has six L1 modules 310, each with its own mirror 714. Three of the modules are on the right of combined beam 114-2, and three of the modules are on the left of the combined beam. As shown in insert B in FIG. 7B, the combined beam 114-2 of the L2 module 310-2 consists of a six-column array of beams 112. The slow axes of beams 112 are parallel to the X axis, and the fast axes are parallel to the Z axis. If the constituent beams 112 are linearly polarized with parallel electric fields, the linear polarization is preserved.

Any even number of L1 modules 310 can be combined in a similar way. For example, in one embodiment, the module 310-2 includes 20 first-level modules 310. Each module 310 has the structure of FIGS. 3A-5B but includes 100 diodes 110. The output beam 114 of each module 310 is 25 mm long in the fast axis (Z axis) and 1.2 mm long in the slow axis (Y axis). The L2 module 310-2 thus has a total of 2,000 diodes 110, and the combined beam 114-2 is 25 mm long in the fast axis and 24 mm long in the slow axis. The angular divergence is 5 mrad in the fast axis and 15 mrad in the slow axis. The L2 module's X×Y dimensions are 500×390 mm In an exemplary application, the diodes 110 are connected in series and require a DC voltage of about 100*2V=200 V and a current of under 10 A.

Figure 8A:
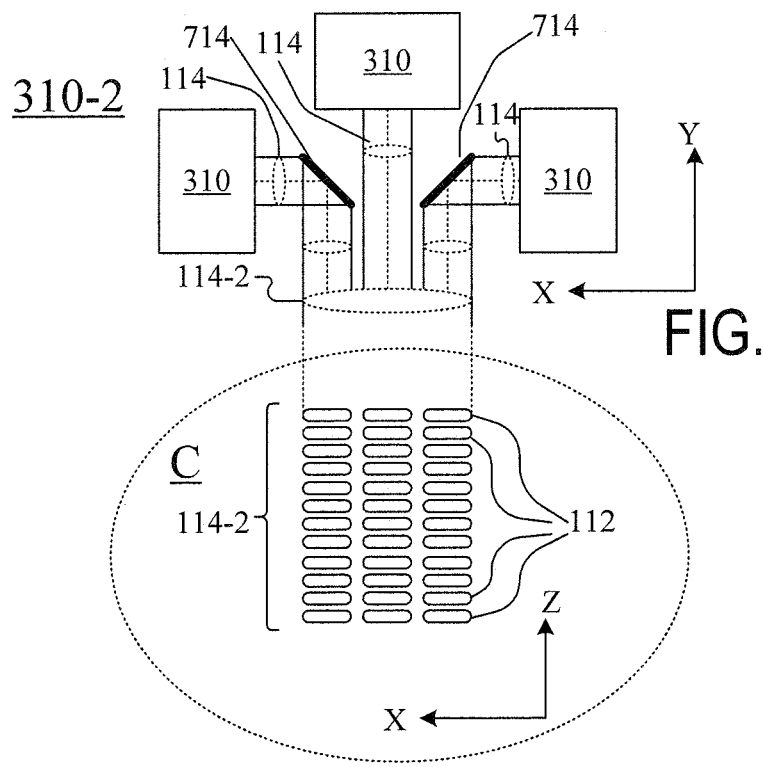

FIG. 8A shows another L2 module 310-2, similar to the module of FIG. 7A but including a third L1 module 310 emitting its beam 114 in the negative Y direction between the beams 114 of the other two L1 modules 310. The optical axes of the three beams 114 lie in the same plane parallel to the XY plane. The middle beam 114 enters the level-2 beam 114-2 without being processed by a mirror or any other optical element. The vertical cross section of beam 114-2 is shown in insert C. The cross-section is parallel to the XZ plane. Beam 114-2 consists of a three-column array of beams 112. The slow axes of beams 112 are parallel to the X axis, and the fast axes are vertical (parallel to the Z axis). In some embodiments, the pitch between the adjacent columns of beams 112 is 1.5 mm, and the separation between adjacent columns at the beginning of beam 114-2 is 10 µm to 30 µm. If the constituent beams 112 are linearly polarized with parallel electric fields, the linear polarization is preserved.

The L2 module of FIG. 8A may have multiple side modules 310 on each side of beam 114-2 as in FIG. 7B, or in other words the module of FIG. 7B can be augmented with a middle module of level 1.

Figure 8B:
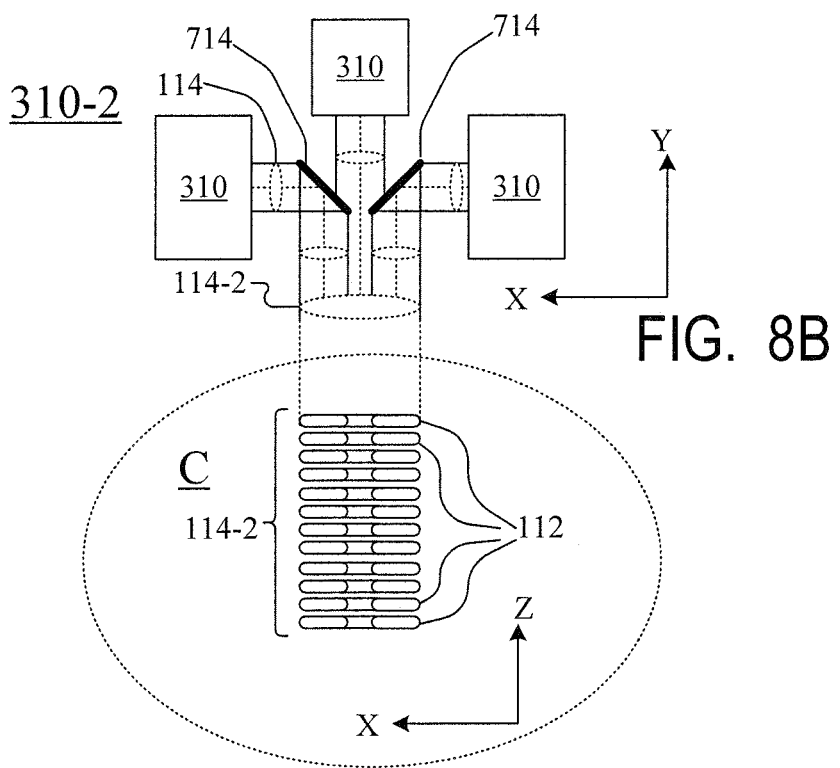

FIG. 8B is similar to FIG. 8A, but in FIG. 8B the side modules 310 are brought closer to the optical axis of combined beam 114-2 to increase the brightness of the combined beam. The mirrors 714 block the sides of the middle beam 114. In some embodiments, the energy intensity of the middle beam 114 has approximately Gaussian distribution, or some other distribution such that the side portions (the blocked portions) are low-energy portions. The low energy loss is acceptable in some applications if the brightness is of paramount importance.

Likewise, if there are more than two side modules 310 (see FIG. 7B), and the side modules 310 are brought closer to each other, then the mirrors 714 closer to the output window may block side portions of beams 114 of modules 310 located farther from the output window. The brightness can be increased thereby.

In some embodiments, to make the intensity of beam 114-2 more symmetric and homogeneous, the level-1 modules 310 of FIGS. 7A, 7B, 8A, 8B are at equal distances from any point on the optical axis of L2 beam 114-2. Therefore, the first-level beams 114 have equal optical path lengths measured to any point in beam 114-2. Further, the variation among the optical path lengths of any constituent beams 112 in beam 114-2 is the same as in each first-level beam 114 if the L1 modules 310 are identical. However, the invention is not limited to modules 310 being identical, or even to modules 310 having the same number of diodes 110. In some embodiments, brightness is an overriding concern, and the L1 modules 310 are located as close as possible to the L2 output to reduce the average optical path of constituent beams 112 and thus to increase the brightness.

Higher-level modules can be constructed using similar techniques. For example, if L1 modules 310 of FIG. 7A, 7B, 8A, 8B are replaced with L2 modules 310-2, a third-level module (L3-module) is obtained. The module's output beam (third-level beam) will consist of two or more beams 114-2 positioned side by side when viewed in a vertical cross section perpendicular to the L3 beam, with the slow axes of beams 112 being horizontal. If the L1 modules are replaced with L3 modules, a fourth-level module will be obtained, and so on. The output power can be increased indefinitely, or at least to a kilo-watt range, due to the high thermal stability of carriers 320. The brightness loss is small because at each level, the spacing between the combined beams is small (e.g. 10 µM to 30 µm) since the combiner module does not use any optical elements for beam combining other than flat mirrors (mirrors 714). In some modules of a level n where n>1, all the constituent modules of each lower level are identical to each other, but this is not necessary. If the constituent modules at each level are identical, then the variation among the optical path lengths of constituent beams 112 is the same as at level 1. If the constituent beams 112 are linearly polarized with parallel electric fields, the linear polarization is preserved.

For a module of any level n, all the constituent modules 310 of the first level are horizontal, i.e. their carriers 320 have their bottom surfaces parallel to the XY plane. In some embodiments The carriers' bottom surfaces are in the same plane. Therefore, carriers 320 can be located on a single base plate 350 and a single cold plate 360 if the base plate and the cold plate are used. Also, carriers 320 can be combined into a single carrier.

Figure 9A:
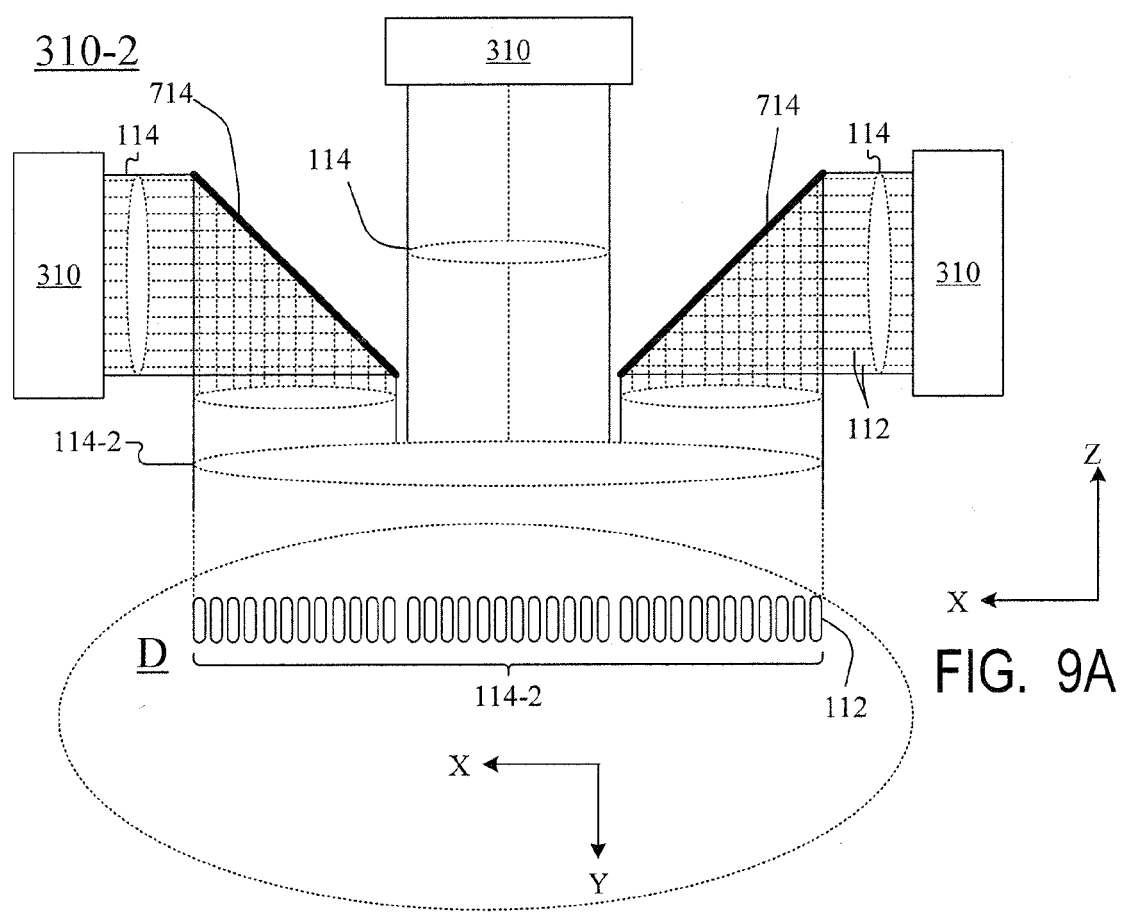
FIGS. 9A, 9B are side views of laser diode modules according to some embodiments of the present invention.

FIG. 9A shows another level-2 combiner of three first-level modules 310. FIG. 9A is a side view in the XZ plane. The module 310 on the right emits a beam 114 consisting of 12 beams 112. The beam 114 propagates in the positive X direction. The module 310 on the left emits a beam 114 in the opposite, negative-X direction. The constituent beams 112 of the two beams 114 have their fast axes parallel to the Z axis, and the slow axes parallel to the Y axis. The optical axes of the two beams 114 are on the same straight line parallel to the X axis.

Each of the two output beams 114 is turned by respective flat mirror 714 by 90° so that the optical axes of the two beams become parallel to the Z axis. The beams 114 reflected by mirrors 714 propagate in the negative Z direction to form level-two combined beam 114-2. A third L1 module 310 emits its beam 114 in the negative Z direction between the beams 114 of the other two L1 modules 310. The optical axes of the three beams 114 lie in the same plane parallel to the XZ plane. The middle beam 114 enters the level-2 beam 114-2 without being processed by a mirror or any other optical element. A horizontal cross section of beam 114-2 is shown in insert D. The cross-sectional plane is parallel to the XY plane. Beam 114-2 consists of a one-row array of 36 beams 112. The slow axes of beams 112 are parallel to the Y axis, and the fast axes are parallel to the X axis. The fast axes lie on the same straight line.

In some embodiments, the two side modules 310 are positioned closer to each other so that the mirrors 714 block the side portions of the middle beam 114 to increase the total brightness at the expense of some lose of the output power.

The left and right modules 310 can share a common base plate 350, and/or a common cold plate 360, and/or a common carrier 320, as in the embodiments of FIGS. 7A, 7B, 8A, 8B. In some embodiments, the middle module 310 is omitted; in this case, the output beam 114-2 consists of 24 beams 112. The other two modules can be positioned close to each other so that the spacing between the adjacent beams 112 is the same as in the case of three L1 modules 310. If the constituent beams 112 are linearly polarized with parallel electric fields, the linear polarization is preserved.

Figure 9B:
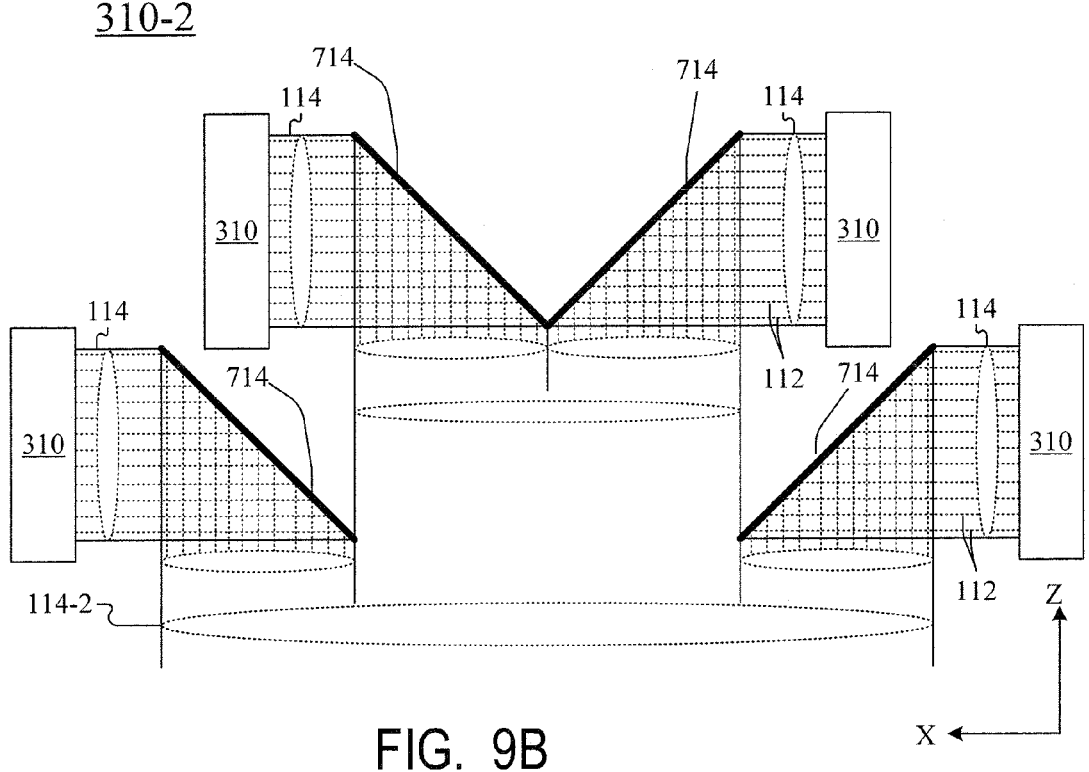

FIG. 9B is similar to FIG. 9A but has four L1 modules 310, each with its own mirror 714. Two of the modules 310 are on the right of combined beam 114-2, and two of the modules 310 are on the left of the combined beam. The combined beam 114-2 of L2 module 310-2 consists of one row of 48 beams 112. The slow axes of beams 112 are parallel to the Y axis, and the fast axes are parallel to the X axis. The fast axes lie on the same straight line. If the constituent beams 112 are linearly polarized with parallel electric fields, the linear polarization is preserved.

The modules 310 located farther from the optical axis of combined beam 114-2 (the bottom modules in FIG. 9B) can be brought closer to the combined beam's optical axis. Then the mirrors 714 closer to the output window (the bottom mirrors) may block side portions of beams 114 of modules 310 (top modules in FIG. 9B) located farther from the output window. The brightness can be increased thereby.

Any even number of L1 modules 310 can be combined in a similar way. An additional module 310 can be added in the middle as in FIG. 9A.

Higher-level modules can be constructed based on the structures described above in connection with FIGS. 9A, 9B if first-level modules 310 are replaced by higher-level modules. See the explanation above in connection with FIGS. 7A, 7B, 8A, 8B. Moreover, in the structures described above in connection with FIGS. 9A, 9B, each L1 module 310 can be replaced by a module of any level constructed according to FIG. 7A, 7B, 8A, 8B. Vice versa, in the structures of FIGS. 7A, 7B, 8A, 8B, each module 310 can be replaced by a module of any level constructed according to FIG. 9A or 9B (each module according to FIG. 9A or 9B may have two or three constituent modules of a lower level). At any higher level, the modules of any preceding level can be as described in connection with any one of FIGS. 7A-9B. For example, in one level-5 module, the second level modules are constructed according to FIG. 7A or 7B; the third level modules are constructed according to FIG. 9A with three level-2 modules; the fourth level modules are constructed according to FIG. 8A or 8B; and the fifth level module is constructed according to FIG. 9B with 10 or 11 level-4 modules. Thus, a different type of structure can be chosen at each level. The beam quality remains near diffraction-limited and of high spectral brightness due to high thermal stability.

Figure 10:
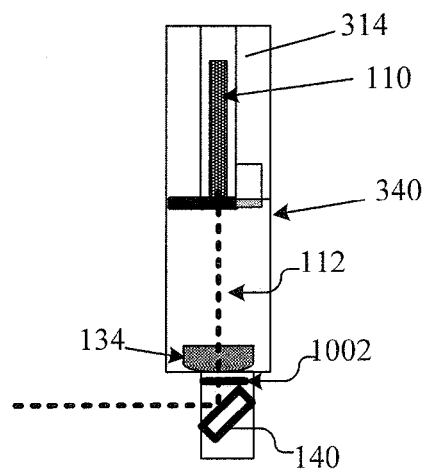
FIG. 10 is a top view of a single-diode subassembly according to some embodiments of the present invention.

FIG. 10 illustrates a single-diode subassembly similar to that of FIGS. 3A-5B but with an additional optical component 1002 located between SAC 134 and mirror 140. For example, this embodiment may be an external cavity laser, and component 1002 may be a Bragg filter reflecting a portion of light energy in a selected narrow bandwidth to stimulate emission in that bandwidth. For example, Bragg filter 1002 reflects 10% of the light energy emitted by diode 110, and passes through the remaining 90% to mirror 140. This stabilization of the output wavelength is sufficiently important for some applications (e.g. pumping of solid-state or gas lasers that absorb the pumping energy only in a narrow spectral bandwidth) to justify the spatial-brightness loss. Filter 1002 may alternatively be located between diode 110 and FAC 130. Filter 1002 is rigidly attached to the corresponding heat-dissipating surface region 340. Each filter 1002 is a separate structure provided for each diode 110. In other embodiments, a single filter can be provided for multiple diodes.

Optical components can be combined. For example, in the embodiment of FIG. 5A, SACs 134 can be omitted. The slow axis collimation can be performed by mirrors 140.

Figure 11:
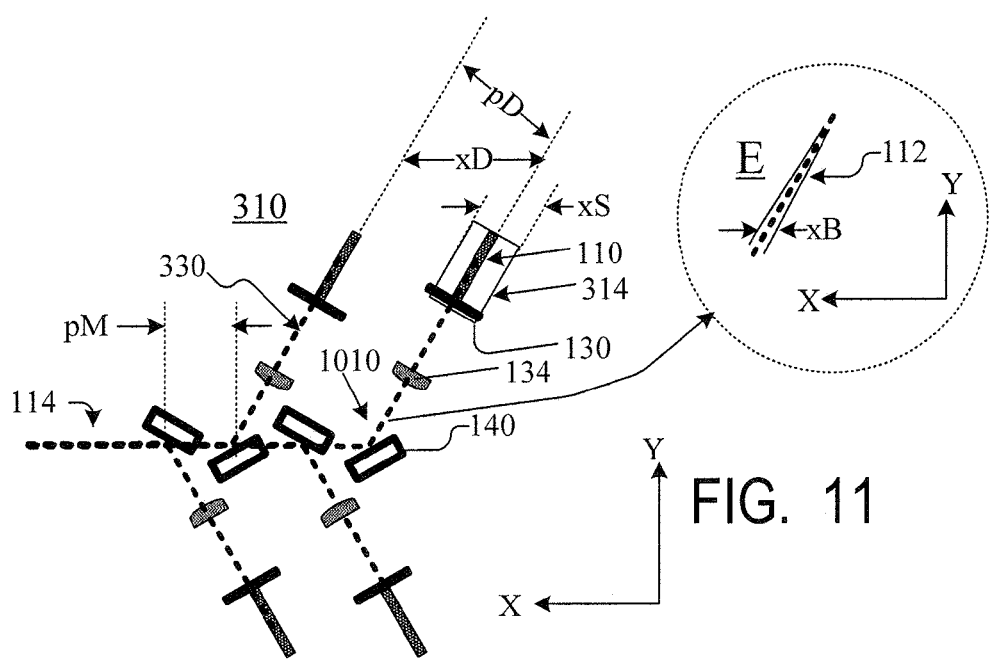
FIG. 11 is a side view of a laser diode module according to some embodiments of the present invention.

FIG. 11 is a top view of another first-level module 310. This module is similar to the module of FIGS. 3A-3D, but the optical axes of diodes 110 are not orthogonal to the combined beam 114. The angle 1010 between the optical axes of diodes 110 and the combined beam 114 is greater than 90°, but angles 1010 below 90° are also possible. In some embodiments, the X-dimension xB (insert E) of beam 112 at the output of SAC 134 or the input of mirror 140, is at most the X-axis mirror pitch pM. The mirror pitch pM is at most one half of the distance xD, along the X-axis, between the optical axes 330 of adjacent diodes 110 on each side of combined beam 114. The mirror pitch pM (the X-distance between the intersections of adjacent mirrors 140 with respective optical axes 330) is at most one half of the X-dimension xS of each submount 314.

As shown by the embodiments discussed above, a module at any level can be built with only mirrors as optical elements except for the FACs and SACs at level 1. In some embodiments, all the mirrors are flat mirrors. This is advantageous because flat mirrors are easy to manufacture. Further, if properly sized and positioned, mirrors provide low losses in brightness and power and low degradation of the beam quality.

In the embodiments of FIGS. 3A-11, if the constituent beams 112 are linearly polarized with parallel electric fields, the linear polarization is preserved. The invention is not limited to such embodiments however. The invention is not limited to linearly polarized light for example.

The invention is not limited to the embodiments described above. Other embodiments and variations are within the scope of the invention, as defined by the appended claims.

For example, some embodiments provide a laser module comprising a thermally dissipative body (e.g. carrier 320) comprising a top surface comprising a plurality of heat-dissipating surface regions (e.g. 340). The laser module comprises a plurality of single-emitter laser diode chips (e.g. 110). The chips may or may not include other circuitry in addition to the laser diodes. Each single-emitter laser diode chip overlies, and is rigidly attached to, a respective one of the heat-dissipating surface regions, and each single-emitter laser diode chip's attachment to the top surface is confined to the respective heat-dissipating surface region. Each single-emitter laser diode chip is positioned to emit a laser beam ("constituent beam", e.g. 112) above the top surface, the constituent beam comprising a fast axis and a slow axis.

The laser module comprises beam-management optics (e.g. FACs 130, SACs 134, mirrors 140, filters 1002, and maybe other optics) for processing the constituent beams. The beam-management optics comprises, for each laser diode chip, a corresponding beam-management-optics portion (e.g. the corresponding FAC 130, SAC 134, mirror 140, filter 1002) for processing the corresponding constituent beam. The beam-management-optics portion is for collimating the constituent beam in the constituent beam's fast and slow axes, and for redirecting the constituent beam.

The beam-management-optics portions are arranged to combine the constituent beams collimated in the fast and slow axes into a combined beam (e.g. 114) propagating along a combined-beam line (e.g. optical axis of beam 114) which is a straight line, with the constituent beams' optical axes being located at respective different heights in the combined beam. (As noted above, the laser modules may be described, herein and in the claims, relative to a certain spatial orientation; the invention is not limited to this or any particular orientation in use, transportation, storage, or manufacture of the laser module.)

For each laser diode chip, the corresponding beam-management-optics portion overlies, and is rigidly attached to, the laser diode chip's heat-dissipating surface region. However, a single component (e.g. filter 1002) may extend over multiple heat-dissipating surface regions to service multiple diodes. The single component will still be rigidly attached to the top surface of carrier 320 and hence to all the heat-dissipating surface regions.

All the attachments to the top surface are thermally dissipative for the thermally dissipative body to dissipate heat from the laser diode chips and the beam-management-optics portions.

The laser diode chips include one or more laser diode chips positioned, in top view, on a first side of the combined-beam line (e.g. chips 110.1, 110.3, 110.5, 110.7, 110.9, 110.11 in FIGS. 3A-5B), and include one or more laser diode chips positioned, in top view, on a second side of the combined-beam line, the second side being opposite from the first side.

In some embodiments, each beam-management-optics portion is structurally separate from each other beam-management-optics portion. Thus, there is no single, integral-structure component servicing multiple diodes.

In some embodiments, each beam-management-optics portion's attachment to the top surface is confined to the respective heat-dissipating surface region and is separate from the attachment of every other beam-management-optics portion to the top surface. This is the case in FIGS. 3A-5B and 10-11 for example.

Other embodiments and variations are within the scope of the invention as defined by the appended claims.

The invention claimed is:

1. A laser module comprising:
   (1) a thermally dissipative body comprising a top surface comprising a plurality of heat-dissipating surface regions;
   (2) a plurality of single-emitter laser diode chips;
   wherein each single-emitter laser diode chip overlies, and is rigidly attached to, a respective one of the heat-dissipating surface regions, and each single-emitter laser diode chip's attachment to the top surface is confined to the respective heat-dissipating surface region;
   wherein each single-emitter laser diode chip is positioned to emit a constituent laser beam above the top surface, the constituent beam comprising a fast axis and a slow axis;
   (3) beam-management optics for processing the constituent beams, the beam-management optics comprising, for each laser diode chip, a corresponding beam-management-optics portion for processing the corresponding constituent beam, the beam-management-optics portion being for collimating the constituent beam in the constituent beam's fast and slow axes, and for redirecting the constituent beam;
   wherein the beam-management-optics portions are arranged to combine the constituent beams collimated in the fast and slow axes into a combined beam propagating along a combined-beam line, with the constituent beams' optical axes being located at respective different heights in the combined beam;
   wherein for each laser diode chip, the corresponding beam-management-optics portion overlies, and is rigidly attached to, the laser diode chip's heat-dissipating surface region;
   wherein all the attachments to the top surface are thermally dissipative for the thermally dissipative body to dissipate heat from the laser diode chips and the beam-management-optics portions;
   wherein the laser diode chips include one or more laser diode chips positioned, in top view, on a first side of the combined-beam line, and include one or more laser diode chips positioned, in top view, on a second side of the combined-beam line, the second side being opposite from the first side.

2. The laser module of claim 1 wherein each beam-management-optics portion is structurally separate from each other beam-management-optics portion.

3. The laser module of claim 2 wherein each beam-management-optics portion's attachment to the top surface is confined to the respective heat-dissipating surface region and is separate from the attachment of every other beam-management-optics portion to the top surface.

4. The laser module of claim 1 wherein the beam-management-optics portions comprise fast-axis collimator optics for fast-axis collimating the laser beams emitted by the single-emitter laser diode chips;

wherein each beam-management-optics portion comprises a slow-axis-collimating-redirecting portion for slow-axis collimating, and redirecting, the laser beam emitted by the respective single-emitter laser diode chip, wherein the slow-axis-collimating-redirecting portion of each single-emitter laser diode chip is structurally separate from the slow-axis-collimating-redirecting portion of every other single-emitter laser diode chip;

wherein for each single-emitter laser diode chip, the respective slow-axis-collimating-redirecting portion overlies, and is rigidly attached to, the single-emitter laser diode chip's heat-dissipating surface region, and the slow-axis-collimating-redirecting portion's attachment to the top surface is confined to the respective heat-dissipating surface region and is separate from the attachment of every other slow-axis-collimating-redirecting portion to the top surface;

wherein all said attachments to the top surface are thermally dissipative for the thermally dissipative body to dissipate heat from the laser diode chips and the respective beam-management-optics portion.

5. The laser module of claim 4 each slow-axis-collimating-redirecting portion comprises:

(a) a slow-axis collimator for collimating the laser beam emitted by the single-emitter laser diode chip, wherein the slow-axis collimator of each single-emitter laser diode chip is structurally separate from the slow-axis collimator of every other single-emitter laser diode chip;

wherein for each single-emitter laser diode chip, the corresponding slow-axis collimator overlies, and is rigidly attached to, the single-emitter laser diode chip's heat-dissipating surface region, and the slow-axis collimator's attachment to the top surface is confined to the respective heat-dissipating surface region and is separate from the attachment of every other slow-axis collimator to the top surface; and (b) a mirror for redirecting the laser beam emitted by the corresponding single-emitter laser diode chip and collimated by the fast-axis collimator optics and the slow-axis collimator;

wherein the mirrors are positioned to form a combined beam from the constituent beams emitted by the single-emitter laser diode chips and collimated by the fast-axis collimator optics and the slow-axis collimators, with the constituent beams' optical axes being located at respective different heights in the combined beam;

wherein for each single-emitter laser diode chip, the corresponding mirror overlies, and is rigidly attached to, the single-emitter laser diode chip's heat-dissipating surface region, and the mirror's attachment to the top surface is confined to the respective heat-dissipating surface region and is separate from the attachment of every other mirror to the top surface;

wherein all said attachments to the top surface are thermally dissipative for the thermally dissipative body to dissipate heat from the laser diode chips, the fast-axis collimator optics, the slow-axis collimators, and the first-beam redirector;

wherein in top view, the combined-beam line passes through the mirrors.

6. The laser module of claim 1 wherein in top view, the laser module has at least two laser diode chips on each of the first and second sides of the combined-beam line, with optical axes of the laser diode chips being parallel to each other, wherein the optical axes of the laser diode chips on each of the first and second sides of the combined-beam line are at a distance pD from each other; and in top view, the optical axes of the laser diode chips on the first side are shifted by less than pD along the combined-beam line relative to the optical axes of the laser diode chips on the second side of the combined-beam line.

7. The laser module of claim 6 further comprising:

(a) a slow-axis collimator for collimating the laser beam emitted by the single-emitter laser diode chip, wherein the slow-axis collimator of each single-emitter laser diode chip is structurally separate from the slow-axis collimator of every other single-emitter laser diode chip;

wherein for each single-emitter laser diode chip, the corresponding slow-axis collimator overlies, and is rigidly attached to, the single-emitter laser diode chip's heat-dissipating surface region, and the slow-axis collimator's attachment to the top surface is confined to the respective heat-dissipating surface region and is separate from the attachment of every other slow-axis collimator to the top surface; and (b) a mirror for redirecting the laser beam emitted by the corresponding single-emitter laser diode chip and collimated by the fast-axis collimator optics and the slow-axis collimator;

wherein the mirrors are positioned to form a combined beam from the constituent beams emitted by the single-emitter laser diode chips and collimated by the fast-axis collimator optics and the slow-axis collimators, with the constituent beams' optical axes being located at respective different heights in the combined beam;

wherein for each single-emitter laser diode chip, the corresponding mirror overlies, and is rigidly attached to, the single-emitter laser diode chip's heat-dissipating surface region, and the mirror's attachment to the top surface is confined to the respective heat-dissipating surface region and is separate from the attachment of every other mirror to the top surface;

wherein all said attachments to the top surface are thermally dissipative for the thermally dissipative body to dissipate heat from the laser diode chips, the fast-axis collimator optics, the slow-axis collimators, and the first-beam redirector;

wherein in top view, the combined-beam line passes through the mirrors;

wherein $$EFL_{SAC} \leq pD/(4*\tan\theta)$$

where $EFL_{SAC}$ is the effective focal length of each slow-axis collimator; and $\theta$ is the slow-axis angle of the marginal ray of each laser diode chip.

8. The laser module of claim 6 further comprising:

(a) a slow-axis collimator for collimating the laser beam emitted by the single-emitter laser diode chip, wherein the slow-axis collimator of each single-emitter laser diode chip is structurally separate from the slow-axis collimator of every other single-emitter laser diode chip;

wherein for each single-emitter laser diode chip, the corresponding slow-axis collimator overlies, and is rigidly attached to, the single-emitter laser diode chip's heat-dissipating surface region, and the slow-axis collimator's attachment to the top surface is confined to the respective heat-dissipating surface region and is separate from the attachment of every other slow-axis collimator to the top surface; and (b) a mirror for redirecting the laser beam emitted by the corresponding single-emitter laser diode chip and collimated by the fast-axis collimator optics and the slow-axis collimator;

wherein the mirrors are positioned to form a combined beam from the constituent beams emitted by the single-emitter laser diode chips and collimated by the fast-axis collimator optics and the slow-axis collimators, with the constituent beams' optical axes being located at respective different heights in the combined beam;

wherein for each single-emitter laser diode chip, the corresponding mirror overlies, and is rigidly attached to, the single-emitter laser diode chip's heat-dissipating surface region, and the mirror's attachment to the top surface is confined to the respective heat-dissipating surface region and is separate from the attachment of every other mirror to the top surface;

wherein all said attachments to the top surface are thermally dissipative for the thermally dissipative body to dissipate heat from the laser diode chips, the fast-axis collimator optics, the slow-axis collimators, and the first-beam redirector;

wherein in top view, the combined-beam line passes through the mirrors;

wherein $$EFL_{SAC} \leq pD/(4*NA_{SA})$$

where
$EFL_{SAC}$ is the effective focal length of each slow-axis collimator; and
$NA_{SA}$ is the slow-axis numerical aperture of each laser diode chip.

9. The laser module of claim 6 wherein in top view, the optical axes of the laser diode chips on the first side are shifted by pD/2 along the combined-beam line relative to the optical axes of the laser diode chips on the second side of the combined-beam line.

10. The laser module of claim 1 wherein in top view, the laser module has at least two laser diode chips on each of the first and second sides of the combined-beam line, with optical axes of the laser diode chips being parallel to each other, wherein the optical axes of the laser diode chips on each of the first and second sides of the combined-beam line are at a distance pD from each other; and
in top view, the optical axes of any two of the laser diode chips are spaced from each other by at most pD*(N−1)/2, where N is the number of the laser diode chips.

11. The laser module of claim 4 wherein the laser diode chips, the fast-axis collimator optics, and the slow-axis-collimating-redirecting portions are positioned so that, in top view each of the constituent beams' widths at an input of the slow-axis-collimating-redirecting portion is no longer than a clear aperture of the corresponding slow-axis-collimating-redirecting portion.

12. The laser module of claim 11 wherein the laser diode chips, the fast-axis collimator optics, and the slow-axis-collimating-redirecting portions are positioned so that the constituent beams have horizontal slow axes in their entire paths from the laser diode chips to outputs of the slow-axis-collimating-redirecting portions.

13. The laser module of claim 5 wherein:
each laser diode chip's attachment to the heat-dissipating surface region comprises a submount rigidly attached to the respective heat-dissipative surface region, the laser diode chip being rigidly attached to submount; and
the laser diode chips, the submounts, the fast-axis collimator optics, the slow-axis collimators, and the mirrors are positioned so that, in top view:
each of the constituent beams' widths at an input of the respective slow-axis collimator is no longer than a clear aperture of the slow-axis collimator;
for each constituent beam, the width of the constituent beam at the output of the respective slow-axis collimator is at most as long as one half of the corresponding submount's width measured in a direction orthogonal to the optical axis of the corresponding laser diode chip.

14. The laser module of claim 5 wherein:
each laser diode chip's attachment to the heat-dissipating surface region comprises a submount rigidly attached to the respective heat-dissipative surface region, the laser diode chip being rigidly attached to submount; and
the laser diode chips, the submounts, the fast-axis collimator optics, the slow-axis collimators, and the mirrors are positioned so that the laser diode chips have horizontal slow axes and, in top view:
each of the constituent beams' slow axes at an input of the respective slow-axis collimator is no longer than a clear aperture of the slow-axis collimator;
for each constituent beam, the slow axis of the constituent beam at the output of the respective slow-axis collimator is at most as long as one half of the corresponding submount's width measured in a direction orthogonal to the optical axis of the corresponding laser diode chip.

15. The laser module of claim 1 wherein:
each laser diode chip's attachment to the heat-dissipating surface region comprises a submount rigidly attached to the respective heat-dissipative surface region, the laser diode chip being rigidly attached to submount;
in top view, the submounts fit into an area which has dimensions such that in a direction of the combined-beam line the area's maximum dimension is smaller than pD*(N+2)/2 where:
pD is a distance between optical axes of adjacent laser diode chips on each side of the combined beam line; and
N is the number of the laser diode chips.

16. The laser module of claim 15 wherein in top view, all the laser diode chips are at equal distances from the combined-beam line.

17. The laser module of claim 15 wherein N is at least 12.

18. The laser module of claim 1 wherein the thermally dissipative body is for conducting heat downward from the top surface to an active cooler.

19. The laser module of claim 18 in combination with the active cooler attached to the body below the body.

20. The laser module of claim 1 wherein each beam-management-optics portion comprises a fast-axis collimator for collimating the laser beam emitted by the respective single-emitter laser diode chip, wherein the fast-axis collimator of each single-emitter laser diode chip is structurally separate from the fast-axis collimator of every other single-emitter laser diode chip;
wherein for each said single-emitter laser diode chip, the corresponding fast-axis collimator overlies, and is rigidly attached to, the single-emitter laser diode chip's heat-dissipating surface region, and the fast-axis collimator's attachment to the top surface is thermally dissipative and is confined to the respective heat-dissipating surface region and is separate from the attachment of every other fast-axis collimator to the top surface.

21. The laser module of claim 5 wherein the mirrors are flat.

22. The laser module of claim 1 wherein the laser diode chips are located at respective different heights, and the beam-management-optics portions are located at respective different heights.

23. A method for manufacturing the laser module of claim 1, the method comprising assembling together the body, the single-emitter laser diode chips, and the beam-management-optics portions.

24. A method for operating the laser module of claim 1, the method comprising:
emitting the laser beams by the laser diode chips; and
actively cooling the body's region located below the top surface to cause downward heat conduction from the top surface to the body's region.

25. A laser module of a level n greater than 1, the laser module of level n comprising a plurality of laser modules of a level i for each level i from 1 to n−1 inclusive, wherein each laser module of level 1 is a laser module according to claim 1;
wherein for each level i from 1 to n inclusive, each laser module of level i is for generating a respective output beam extending along an output-beam line which is a straight line, wherein for each laser module of level 1, the output-beam line is the combined-beam line of the laser module of level 1;
wherein for each level i greater than 1, the laser module of level i comprises two or more laser modules ("constituent laser modules") of level i−1;
wherein for each laser module of level i greater than 1:
the laser module's output-beam line passes between the laser module's constituent laser modules of level i−1;
the laser module of level i comprises, for each of its constituent laser modules, a mirror for redirecting the constituent laser module's output beam to travel along the output-beam line of the laser module of level i.

26. The laser module of level n according to claim 25 wherein at least one laser module of a level i greater than n comprises an additional constituent module positioned to emit an output beam along the output-beam line of the at least one laser module of level i.

27. A laser module comprising:
(1) a thermally dissipative body comprising a top surface comprising a plurality of heat-dissipating surface regions;
wherein for each two heat-dissipating surface regions, one of the two heat-dissipating surface regions is higher than the other one;
(2) a plurality of single-emitter laser diode chips;
wherein each single-emitter laser diode chip overlies, and is rigidly attached to, a respective one of the heat-dissipating surface regions, and each single-emitter laser diode chip's attachment to the top surface is confined to the respective heat-dissipating surface region;
wherein emitters of different single-emitter laser diode chips are positioned at respective different heights;
(3) for each laser diode chip:
(a) a respective fast-axis collimator for collimating a constituent laser beam emitted by the laser diode chip; and
(b) a respective slow-axis collimator for collimating the constituent laser beam, wherein the slow-axis collimators are positioned at respective different heights;
wherein for each single-emitter laser diode chip, the corresponding slow-axis collimator overlies, and is rigidly attached to, the single-emitter laser diode chip's heat-dissipating surface region, and the slow-axis collimator's attachment to the top surface is confined to the respective heat-dissipating surface region and is separate from the attachment of every other slow-axis collimator to the top surface;
(c) a respective flat vertical mirror for redirecting the constituent laser beam collimated by the fast-axis collimator optics and the slow-axis collimator optics;
wherein the mirrors are positioned at respective different heights;
wherein for each single-emitter laser diode chip, the corresponding mirror overlies, and is rigidly attached to, the single-emitter laser diode chip's heat-dissipating surface region, and the mirror's attachment to the top surface is confined to the respective heat-dissipating surface region and is separate from the attachment of every other mirror to the top surface;
wherein all said attachments to the top surface are thermally dissipative for the thermally dissipative body to dissipate heat from the laser diode chips, the fast-axis and slow-axis collimator optics, and the first-beam redirector;
wherein in top view, the combined beam is to extend along a combined-beam line which, in top view, passes through the mirrors;
wherein the laser diode chips include one or more laser diode chips positioned, in top view, on a first side of the combined-beam line, and include one or more laser diode chips positioned, in top view, on a second side of the combined-beam line, the second side being opposite from the first side.

28. The laser module of claim 27 wherein:
each laser diode chip's attachment to the heat-dissipating surface region comprises a submount rigidly attached to the respective heat-dissipative surface region, the laser diode chip being rigidly attached to submount; and
in top view, the submounts fit into an area which has dimensions such that in a direction of the combined-beam line the area's maximum dimension is smaller than $pD*(N+2)/2$ where:
pD is a distance between optical axes of adjacent laser diode chips on each side of the combined beam line; and
N is the number of the laser diode chips.

29. The laser module of claim 28 wherein in top view, the laser module has at least two laser diode chips on each of the first and second sides of the combined-beam line, with optical axes of the laser diode chips being parallel to each other, wherein the optical axes of the laser diode chips on each of the first and second sides of the combined-beam line are at a distance pD from each other; and
in top view, the optical axes of the laser diode chips on the first side are shifted by pD/2 along the combined-beam line relative to the optical axes of the laser diode chips on the second side of the combined-beam line.

30. The laser module of claim 28 wherein in top view, all the laser diode chips are at equal distances from the combined-beam line.

31. The laser module of claim 27 wherein the laser diode chips, the fast-axis collimator optics, the slow-axis collimator optics, and the mirrors are positioned so that the laser diode chips have horizontal slow axes and, in top view:
each of the constituent beams' widths at an input of the slow-axis collimator optics is no longer than a clear aperture of each slow-axis collimator; and
the slow axis of each constituent beam at the output of the slow-axis collimator optics is at most as long as one half of a pitch between optical axes of any two adjacent laser diode chips on each of the first and second sides of the combined-beam line.

32. The laser module of claim 27 wherein:
each laser diode chip's attachment to the heat-dissipating surface region comprises a submount rigidly attached to the respective heat-dissipative surface region, the laser diode chip being rigidly attached to submount; and
the laser diode chips, the submounts, the fast-axis collimator optics, the slow-axis collimator optics, and the mirrors are positioned so that the laser diode chips have horizontal slow axes and, in top view:
each of the constituent beams' widths at an input of the slow-axis collimator optics is no longer than a clear aperture of each slow-axis collimator;
for each constituent beam, the slow axis of the constituent beam at the output of the slow-axis collimator optics is at most as long as one half of the corresponding submount's width measured in a direction orthogonal to the optical axis of the corresponding laser diode chip.

33. The laser module of claim 27 wherein the thermally dissipative body is for conducting heat downward from the top surface to an active cooler.

34. The laser module of claim 27 wherein for each said single-emitter laser diode chip, the corresponding fast-axis collimator overlies, and is rigidly attached to, the single-emitter laser diode chip's heat-dissipating surface region, and the fast-axis collimator's attachment to the top surface is thermally dissipative and is confined to the respective heat-dissipating surface region and is separate from the attachment of every other fast-axis collimator to the top surface.

35. The laser module of claim 34 wherein none of the laser diode chips, the fast-axis collimators, the slow axis collimators, and the mirrors overlies any other one of the laser diode chips, the fast-axis collimators, the slow axis collimators, and the mirrors.

36. A method for manufacturing the laser module of claim 27, the method comprising assembling together the body, the single-emitter laser diode chips, the fast-axis and slow-axis collimators, and the mirrors.

37. A method for operating the laser module of claim 27, the method comprising:
emitting the laser beams by the laser diode chips; and
actively cooling the body's region located below the top surface to cause downward heat conduction from the top surface to the body's region.

38. A laser module of a level n greater than 1, the laser module of level n comprising a plurality of laser modules of a level i for each level i from 1 to n−1 inclusive, wherein each laser module of level 1 is a laser module according to claim 27;
wherein for each level i from 1 to n inclusive, each laser module of level i is for generating a respective output beam extending along an output-beam line, wherein for each laser module of level 1, the output-beam line is the combined-beam line of the laser module of level 1;
wherein for each level i greater than 1, the laser module of level i comprises two or more laser modules ("constituent laser modules") of level i−1;
wherein for each laser module of level i greater than 1:
the laser module's output-beam line passes between the laser module's constituent laser modules of level i−1;
the laser module of level i comprises, for each of its constituent laser modules, a mirror for redirecting the constituent laser module's output beam to travel along the output-beam line of the laser module of level i.

39. The laser module of level n according to claim 38 wherein at least one laser module of a level i greater than n comprises an additional constituent module positioned to emit an output beam along the output-beam line of the at least one laser module of level i.

40. The laser module of claim 1 wherein for each two heat-dissipating surface regions, one of the two heat-dissipating surface regions is higher than the other one.

\* \* \* \* \*

UNITED STATES PATENT AND TRADEMARK OFFICE
CERTIFICATE OF CORRECTION

PATENT NO. : 8,432,945 B2  
APPLICATION NO. : 12/895451  
DATED : April 30, 2013  
INVENTOR(S) : Victor Faybishenko Page 1 of 1

It is certified that error appears in the above-identified patent and that said Letters Patent is hereby corrected as shown below:

In the Claims

In Claim 5 (column 17, line 22), please insert --wherein-- between "claim 4" and "each".

Signed and Sealed this  
Twenty-fifth Day of June, 2013

Teresa Stanek Rea  
*Acting Director of the United States Patent and Trademark Office*